United States Patent
Hui et al.

(10) Patent No.: US 9,265,029 B2
(45) Date of Patent: Feb. 16, 2016

(54) METHOD OF TRANSFERRING MULTICAST DATA, UPDATING METHOD OF MULTICAST TREE, SYSTEM AND DEVICE THEREOF

(75) Inventors: Min Hui, Beijing (CN); Hui Deng, Beijing (CN); Zhen Cao, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 156 days.

(21) Appl. No.: 13/995,851

(22) PCT Filed: Dec. 20, 2011

(86) PCT No.: PCT/CN2011/084296
§ 371 (c)(1),
(2), (4) Date: Jun. 19, 2013

(87) PCT Pub. No.: WO2012/083844
PCT Pub. Date: Jun. 28, 2012

(65) Prior Publication Data
US 2013/0279397 A1    Oct. 24, 2013

(30) Foreign Application Priority Data
Dec. 20, 2010  (CN) .......................... 2010 1 0597699

(51) Int. Cl.
*H04W 72/00*  (2009.01)
*H04W 36/02*  (2009.01)
(Continued)

(52) U.S. Cl.
CPC .......... *H04W 72/005* (2013.01); *H04W 36/026* (2013.01); *H04W 76/002* (2013.01); *H04W 36/0016* (2013.01); *H04W 36/12* (2013.01); *H04W 40/36* (2013.01)

(58) Field of Classification Search
CPC .......... H04W 36/0016; H04W 36/026; H04W 36/12; H04W 72/005; H04W 76/002; H04W 40/36
USPC ........................... 370/312, 331, 328; 455/442
See application file for complete search history.

(56) References Cited

U.S. PATENT DOCUMENTS

2004/0205215 A1*  10/2004  Kouvelas et al. ............. 709/231
2006/0198345 A1*   9/2006  Chen ............................. 370/338
(Continued)

FOREIGN PATENT DOCUMENTS

CN       101159751 A      4/2008
CN       101873658 A     10/2010
(Continued)

OTHER PUBLICATIONS

Vida, R et al., "Multicast Listener Discovery Version 2 (MLDv2) for IPv6", Jun. 2004, IETF Network Working Group, RFC 3810, pp. 1, 13 and 14.*
Partridge, C et al., "IPv6 Router Alert Option", Oct. 1999, IETF Network Working Group, RFC 2711, pp. 2 and 3.*
(Continued)

*Primary Examiner* — Un C Cho
*Assistant Examiner* — Shah Rahman
(74) *Attorney, Agent, or Firm* — Harness, Dickey & Pierce, P.L.C.

(57) ABSTRACT

The invention discloses a method of transferring multicast data, a method for updating a multicast tree, a system and a device thereof, the main technical solution comprise: a first Mobile Access Gateway (MAG) receives pre-handover message transmitted from a Multicast Source before it handovers from the current accessed first MAG to the second MAG; the first MAG according to the second MAG ID carried in the pre-handover message, establishes a bidirectional tunnel with the second MAG; and the first MAG multicasts multicast data from a Multicast Source, based on the established bidirectional tunnel and the definitive post-handover multicast mode which is the multicast mode adopted by the Multicast Source after handovers to the second MAG. Adopting the technical solution, by previously establishing bidirectional tunnel, the first MAG transfers multicast data by the established directional tunnel when performing binding, updating and authenticating between the Multicast Source and the second MAG, which reduces the interruption delay of multicast service due to the switching among MAGs by Multicast Source.

4 Claims, 15 Drawing Sheets

(51) Int. Cl.
*H04W 76/00* (2009.01)
*H04W 40/36* (2009.01)
*H04W 36/00* (2009.01)
*H04W 36/12* (2009.01)

(56) References Cited

U.S. PATENT DOCUMENTS

| | | | |
|---|---|---|---|
| 2007/0008910 A1* | 1/2007 | Muller et al. | 370/260 |
| 2007/0121574 A1* | 5/2007 | Igarashi et al. | 370/351 |
| 2008/0084847 A1* | 4/2008 | Xia et al. | 370/331 |
| 2010/0208691 A1* | 8/2010 | Toyokawa | H04L 45/306 370/331 |
| 2011/0202761 A1* | 8/2011 | Sarela et al. | 713/163 |
| 2012/0201222 A1* | 8/2012 | Muhanna | H04W 36/0033 370/331 |

FOREIGN PATENT DOCUMENTS

| | | | | |
|---|---|---|---|---|
| CN | 101909276 A | 12/2010 | | |
| EP | 2012478 A1 * | 1/2009 | ............ | H04L 12/185 |

OTHER PUBLICATIONS

Fenner, B et al., "Protocol Independent Multicast-Sparse Mode (PIM-SM): Protocol Specification (Revised)", Aug. 2006, IETF Network Working Group, RFC 4601, Pages: all.*
Romdhani, Imed et al. "Transparent Handover for Mobile Multicast Sources", Apr. 2006, IEEE, Proceedings of the International Conference on Networking (ICNICONSMCL'06), pp. 145-148.*
Partridge, C. et al., "IPv6 Router Alert Option", Oct. 1999, Network Working Group, Request for Comments: 2711, pp. 23.*
International Search Report (in Chinese with English translation) for PCT/CN2011/084296, mailed Mar. 29, 2012; ISA/CN.

* cited by examiner

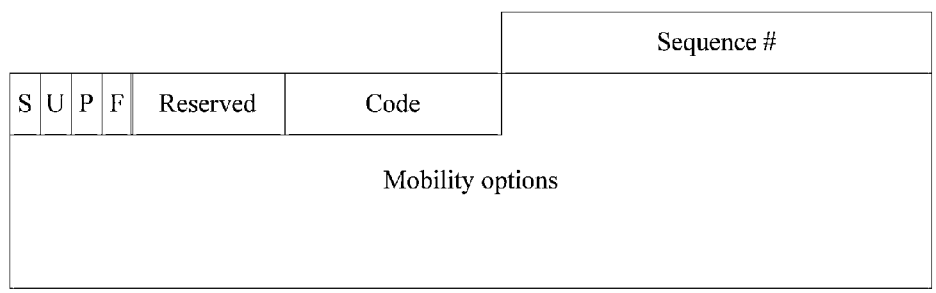
FIG. 5
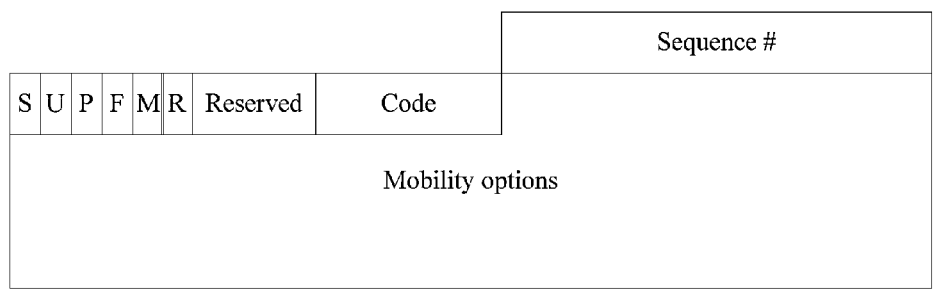
FIG. 6
| Type | Length | Option-Code | Reserved |
|---|---|---|---|
| Multicast Address ||||
| Multicast Source Home Address ||||
| RP Address(Option-Code=0) ||||
FIG. 7

| U | P | F | Reserved | Code | Sequence # |
|---|---|---|----------|------|------------|
| | | | | | |
| Mobility options | | | | | |

FIG. 8

| U | P | F | M | R | Reserved | Code | Sequence # |
|---|---|---|---|---|----------|------|------------|
| | | | | | | | |
| Mobility options | | | | | | | |

FIG. 9

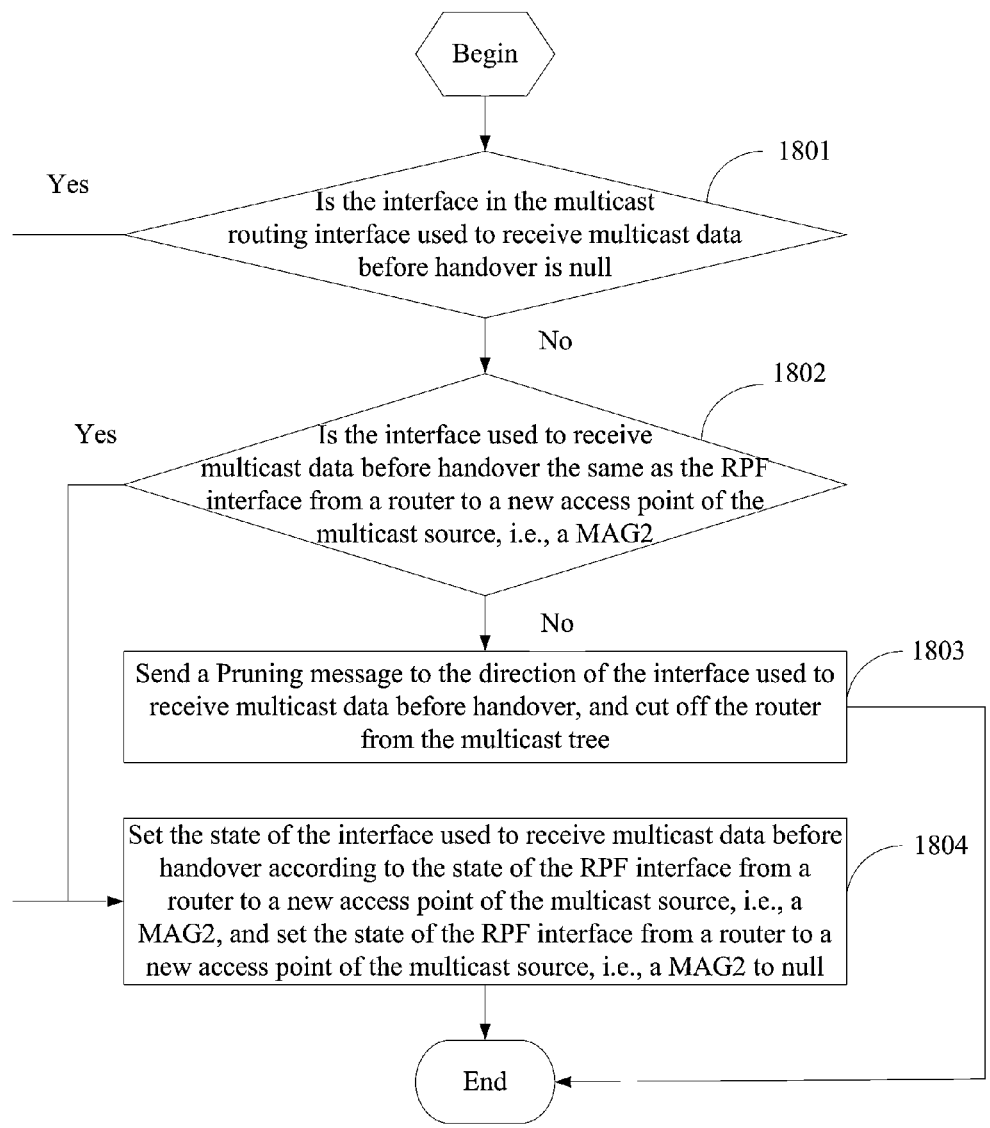

METHOD OF TRANSFERRING MULTICAST DATA, UPDATING METHOD OF MULTICAST TREE, SYSTEM AND DEVICE THEREOF

CROSS-REFERENCE TO RELATED APPLICATIONS

This application is a 371 US national stage of International Application No. PCT/CN2011/084296 field on Dec. 20, 2011, which claims the priority of the Chinese Patent Application No. 201010597699.6, entitled "METHOD OF TRANSFERRING MULTICAST DATA, UPDATING METHOD OF MULTICAST TREE, SYSTEM AND DEVICE THEREOF", filed with the Chinese Patent Office on Dec. 20, 2010, both of which are herein incorporated by reference in their entirety.

FIELD OF THE INVENTION

The present invention relates to the technical field of mobile communication, and particularly to a method for transmitting multicast data, a method for updating a multicast tree, and a system and a device thereof.

BACKGROUND OF THE INVENTION

In recent years, as the wireless technology matures, more people are using wireless devices to access networks, and the desire to access networks anytime and anywhere is increasing. Supporting mobile communication becomes an inevitable requirement for the development of networking. Numerous studies on how a network provides mobility support has been done, among which, PMIPv6 (Proxy Mobile IPv6) of IETF (Internet Engineering Task Force), as a localized mobility management technology, the mobility management function is shifted from the terminal side to the network side, so that the network represents the host to manage the IP mobility, and a mobile entity in the network is responsible for tracking the moving of the host and initiating the required mobile signals transmission. In PMIPv6, the IP (Internet Protocol) mobility of the host is achieved without the host participating in any mobility-related signal transmission, thereby the burden of the terminal is greatly alleviated, and the centralized control is facilitated.

In another aspect, multicast technology is increasingly used in various fields widely. Multicast is a way of point-to-multipoint information transmission, and requires that data can be transmitted simultaneously from one source node to multiple destination nodes which constitute a particular set of nodes (also known as a group or cluster). Due to its advantages, such as high network utilization rate, reduced backbone network congestion, saved resource, and strong scalability, the multicast technology plays an important role in new type network applications, such as video conferencing, document distributing, real-time information distributing, and IP TV. In a typical mobile IPTV (Interactive Personality TV) application, a large number of users can obtain audio/video stream data distributed via a network by the multicast technology.

With the development of mobile communication technology, the combination of mobility and multicasting becomes an urgent requirement. In the mobile environment, since the wireless link has limited bandwidth and high error rate, and a mobile node has limited energy supply, processor capability and the like, new challenges to the traditional multicast technology have been arised. The traditional multicast protocol is based on a fixed-network, wired-communication mode, and can not meet the requirement for mobility. Mobile multicast architecture not only needs to deal with dynamic changes of the mobile host's position, but also needs to deal with group memberships which dynamically change in the multicast group. Generally speaking, the multicast architecture in the mobile environment needs to meet the following requirements: seamless continuity of multicast dialogues in the event of node handover; optimal routing of data packets; stream handover support in multicast communication (different streams have different characteristics and identifiers); avoiding specialization of the multicast solution (supporting only multicast, not unicast); having capability of dealing with packet loss and duplicate copies; multicast data stream dynamically adapting to the states of the current network (to adjust the sending rate, etc.); easy to be deployed; accelerating the convergence speed of the routing protocol and the like.

Currently, the studies on supporting multicast source mobility by the IETF are still in the initial stage, and a solution of supporting multicast source mobility in PMIPv6 has been proposed. This solution includes RPT (Rendezvous Point Tree) and SPT (Shortest Path Tree) based methods in PMIPv6.

With the solution, in the case where multicast data are transmitted in the RPT mode, a LMA (Local Mobility Anchor) is used as a RP (Rendezvous Point) to reply a Join message sent by a multicast receiving node, and to establish a shortest path multicast tree from the LMA to the multicast receiving node. Multicast data are sent to the LMA by a multicast source, and then forwarded to the multicast receiving node along the multicast tree by the LMA. In this mode, when the multicast source moves, there is no need to re-establish the shortest path tree from the LMA to the multicast receiving node, so the multicast tree is relatively stable. However, in this mode, since the path forwarding multicast data by the LMA is not the optimal routing from the multicast source to the multicast receiving node, significant delay and network burden may be introduced.

In the RPT mode, after a multicast source MN enters into a PMIPv6 domain, a procedure is performed as shown in FIG. 1, and the procedure mainly includes the following steps.

In step 101, a link between a Mobile Access Gateway MAG1 and a multicast source MN is established, and the multicast source MN includes "S"=1 and "J"=1 in a RS (Router Solicitation) message to identify that the multicast source MN is a multicast source and a RPT mode is selected.

In step 102, the MAG1 sends an extended PBU message to a LMA, and establishes a bidirectional tunnel between the MAG1 and the LMA when it is determined that the multicast source MN is attached to the MAG1.

In step 102, on receipt of the PBU message, the LMA analyzes extended information contained in the PUB message, and replies a multicast Join message.

In step 103, multicast data are sent to the LMA by the multicast source MN in the basic manner defined in PMIPv6.

In this step, an SPT between the LMA and a multicast receiving node is established, and multicast data are transmitted between the LMA and the multicast receiving node in accordance with the multicast routing protocol.

In step 104, the multicast source MN moves to an MAG2, and sends multicast-related information to the MAG2 using the RS message.

In step 105, a bidirectional tunnel between the LMA and the MAG2 is updated.

In step 105, the SPT between the LMA and the multicast receiver is not affected in the process of updating the bidirectional tunnel between the LMA and the MAG2.

When the multicast source MN is switched, multicast data are transmitted continually. The moving of the mobile multicast source does not affect the multicast receiver.

With the solution, in the case where multicast data is transmitted in the SPT mode, the multicast source replies a Join message sent by a multicast receiving node, and establishes directly a shortest path multicast tree from the multicast source to the multicast receiving node, and multicast data are sent directly to the multicast receiving node along the established multicast tree. In this mode, network delay is shorter due to the optimization of the routing, but the router storage burden will be too heavy and the multicast tree will be unstable. When the multicast source moves in the network, the multicast tree needs to be updated frequently.

In the SPT mode, after a multicast source MN enters into a PMIPv6 domain, a procedure is performed as shown in FIG. 2, and the procedure mainly includes the following steps.

In step 201, a link between an MAG1 and a multicast source MN is established, and the multicast source MN includes "S"=1 and "J"=0 in a RS message to identify that the multicast source MN is a multicast source and a RPT mode is selected.

In step 202, the MAG1 sends an extended PBU message to a LMA, and establishes a bidirectional tunnel between the MAG1 and the LMA when it is determined that the multicast source MN is attached to the MAG1.

In step 202, on receipt of the PBU message, the LMA analyzes extended information contained in the PBU message but does not reply a multicast Join message.

In step 203, multicast data are sent to the LMA by the multicast source MN in the basic manner defined in PMIPv6.

In step 203, when the LMA redirects the multicast Join message to the multicast source MN, an SPT between the multicast source and a multicast receiving node begins to be established, and the subsequent multicast data are transmitted between the multicast source and the multicast receiving node along the optimized path.

In step 204, the multicast source MN sends, after moving to an MAG2, multicast-related information to the MAG2 using the RS message.

In step 205, a bidirectional tunnel between the LMA and the MAG2 is updated.

In step 205, the SPT between the multicast source and the multicast receiving node also needs to be updated when the bidirectional tunnel between the LMA and the MAG2 is updated, because the root node of the multicast tree moves to a different position.

As defined in the solution, the multicast source selects the mode in accordance with a moving speed. If a multicast source moves in the network at a lower speed, a shortest path multicast tree is established between the multicast source and a multicast receiving node in the manner of SPT; and if the multicast source moves faster in the network, the shortest path multicast tree is established between the LMA and a multicast receiving node in the manner of RPT and by taking the LMA acting as a rendezvous node.

The disadvantages of the prior art lie in that it can not support a fast handover of the multicast source, and a large delay happens if the multicast source is switched between two MAGs in a PMIPv6 domain. As prescribed in the existing solution, it is needed to perform the processes, such as binding, updating, and authenticating, and particularly it is needed to perform the process of reconstructing the multicast tree in the SPT mode, when the multicast source moves from an old MAG (i.e., the MAG1) to a new MAG (i.e., the MAG2). Multicast data distribution may be continued only when these processes are completed, this causes long time interruption of multicast service. Since the feature of one-to-multiple in the multicast service, the handover delay of the multicast source will affect all users within the group, it is obvious that the seamless continuity of the multicast dialogues is not satisfied, and in particular, the applications with real-time requirement are affected seriously.

SUMMARY OF THE INVENTION

In view of this, an embodiment of the present invention provides a method for transmitting multicast data, a method for updating a multicast tree, and a system and a device thereof. With this technical solution, interruption delay of multicast service due to a handover of a multicast source among Mobile Access Gateways (MAGs) can be reduced, and the real-time capability of multicast service in the PMIPv6 can be guaranteed.

The embodiment of the present invention can be implemented by the following technical solutions.

According to an aspect of the embodiment of the present invention, a method for transmitting multicast data is provided, which includes:

receiving, by a first Mobile Access Gateway (MAG), a handover message sent by a multicast source before its handover from the first MAG, to which the multicast source is currently accessed, to a second MAG, wherein the handover message carries identifier information of the second MAG;

establishing, by the first MAG, a bidirectional tunnel between the first MAG and the second MAG according to the identifier information of the second MAG carried in the handover message; and multicasting multicast data from the multicast source, based on a determined post-handover multicast mode and the established bidirectional tunnel, wherein the post-handover multicast mode is a multicast mode adopted by the multicast source after the handover to the second MAG.

According to an aspect of the embodiment of the present invention, a method for updating a multicast tree is provided, which includes:

receiving, by a first multicast node, a data packet sent by a first Mobile Access Gateway (MAG);

constructing a Join message for generating a multicast tree when it is determined that a multicast source handover instruction is carried in the data packet, and forwarding address information of a second MAG carried in the data packet via the Join message;

updating, by a second multicast node which receives the Join message, a multicast routing according to the address information of the second MAG carried in the Join message; and continuing forwarding the Join message until the multicast node receives the Join message after the multicast source updates the multicast routing according to the address information of the second MAG.

According to an aspect of the embodiment of the present invention, a system for transmitting multicast data is provided, which includes:

a multicast source, a first Mobile Access Gateway (MAG) and a second MAG; in which the multicast source is adapted to send a handover message to the first MAG before handover of the multicast source from the first MAG, to which the multicast source is currently accessed, to the second MAG, wherein the handover message carries identifier information of the second MAG; and the first MAG is adapted to establish a bidirectional tunnel between the first MAG and the second MAG according to the identifier information of the second MAG carried in the handover message sent by the multicast source, and to multicast data from the multicast source based on a determined post-handover multicast mode and the established bidirectional tunnel, wherein the post-handover multicast mode is a multicast mode adopted by the multicast source after the handover to the second MAG.

According to an aspect of the embodiment of the present invention, a device for transmitting multicast data is provided, which includes:

a pre-handover message receiving unit, adapted to receive a handover message sent by a multicast source before handover of the multicast source from a first Mobile Access Gateway (MAG), to which the multicast source is currently accessed, to a second MAG, wherein the handover message carries identifier information of the second MAG;

a tunnel establishing unit, adapted to establish a bidirectional tunnel between the first MAG and the second MAG according to the identifier information of the second MAG carried in the handover message received by the handover message receiving unit; and a multicast data transmitting unit, adapted to multicast data from the multicast source, based on a determined post-handover multicast mode and the bidirectional tunnel established by the multicast data transmitting unit, wherein the post-handover multicast mode is a multicast mode adopted by the multicast source after the handover to the second MAG.

According to an aspect of the embodiment of the present invention, a system for updating a multicast tree is provided, which includes:

a first multicast node, adapted to receive a data packet sent by a first Mobile Access Gateway (MAG), constructing a Join message for generating a multicast tree if it is determined that a multicast source handover instruction is carried in the data packet, load the Join message with address information of a second MAG carried in the data packet, and forward the Join message;

a second multicast node, adapted to receive the Join message forwarded by the first multicast node, update a multicast routing according to the address information of the second MAG carried in the Join message, and forwarding the Join message until the multicast node receives the Join message after the multicast node updates the multicast routing according to the address information of the second MAG.

With at least one of the above-described technical solutions according to the embodiment of the present invention, the first MAG receives a handover message including the identifier of the second MAG sent by the multicast source; establishes a bidirectional tunnel between the first MAG and the second MAG which corresponds to the identifier of the second MAG according to the identifier of the second MAG included in the handover message; and multicasts multicast data from the multicast source based on a determined post-handover multicast mode and the established bidirectional tunnel, the post-handover multicast mode is a multicast mode adopted by the multicast source after its handover to the second MAG. With this technical solution, since the handover message is sent before the handover of the multicast source from the first MAG, to which the multicast source is currently accessed, to the second MAG, the first MAG can transmits multicast data via the established directional tunnel when performing binding, updating, authenticating and the like between the multicast source and the second MAG, thereby the interruption delay of multicast service due to the handover of multicast source among MAGs is reduced, and the real-time capability and continuity of multicast service in the PMIPv6 system is guaranteed.

Other features and advantages of the invention will be set out in the subsequent specification, and will become obvious from the specification partially or will be understood by implementing the present invention. Objects and other advantages of the present invention may be realized and obtained by the structure specially pointed out in the specification, claims and accompanying drawings.

BRIEF DESCRIPTION OF THE DRAWINGS

The accompanying drawings are provided for further understanding the present invention and constitute a part of the specification, and together with the embodiment of the present invention serve to interpret but do not limit the present invention. In which:

FIG. 5 is a schematic diagram of a basic format of a HI message defined in the prior art;

FIG. 6 is a schematic diagram of a basic format of an extended HI message according to the first embodiment of the present invention;

FIG. 7 is a schematic diagram of a format of a handover option of a multicast source according to the first embodiment of the present invention;

FIG. 8 is a schematic diagram of a basic format of a HAck message defined in the prior art;

FIG. 9 is a schematic diagram of a format of an extended HAck message according to the first embodiment of the present invention;

FIG. 17 is a schematic diagram of the format of a multicast source handover option according to the first embodiment of the present invention;

FIG. 18 is a flowchart of further updating a multicast router according to the first embodiment of the present invention;

DETAILED DESCRIPTION OF THE INVENTION

Figure 1:
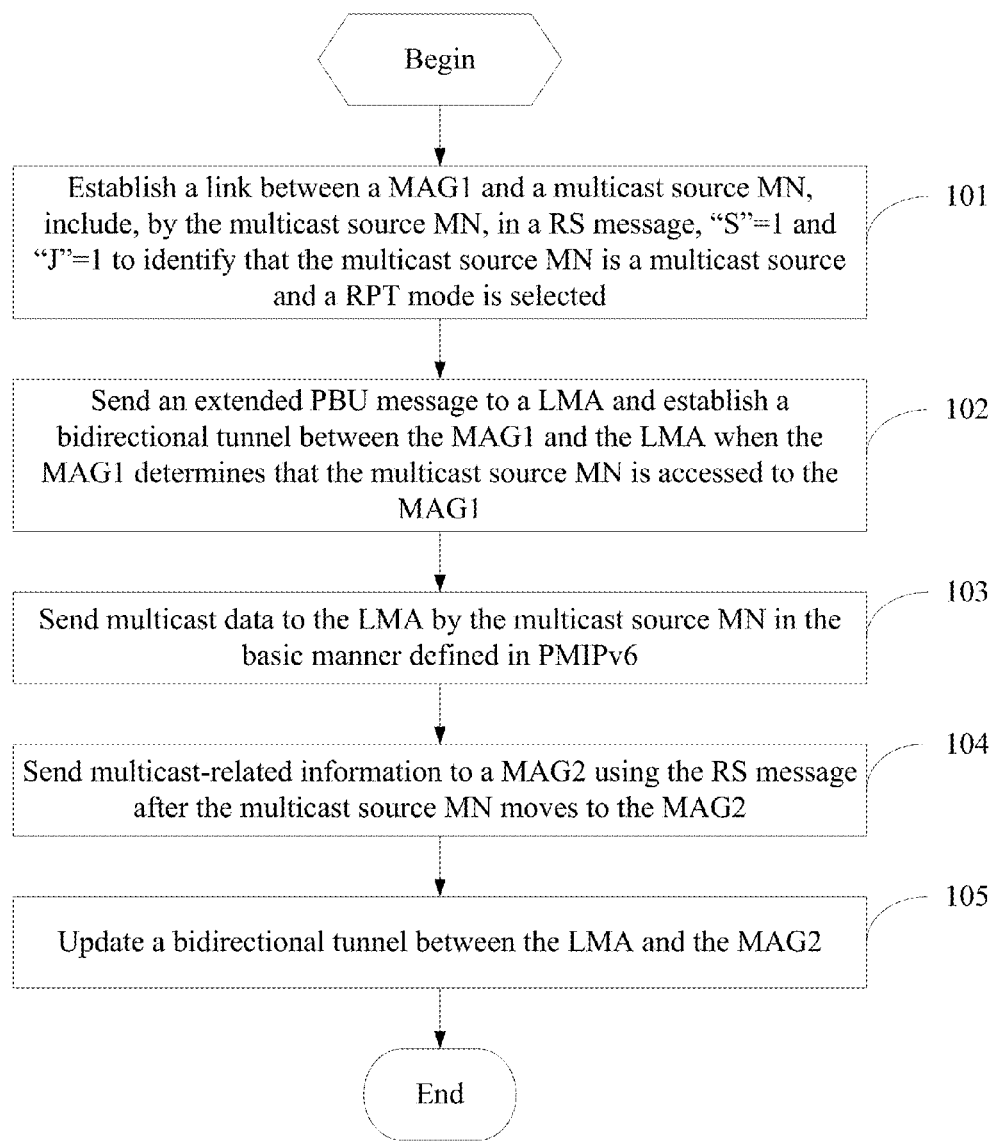
FIG. 1 is a flowchart of a handover of a multicast source to a PMIPv6 domain in a RPT mode in the prior art.
Figure 2:
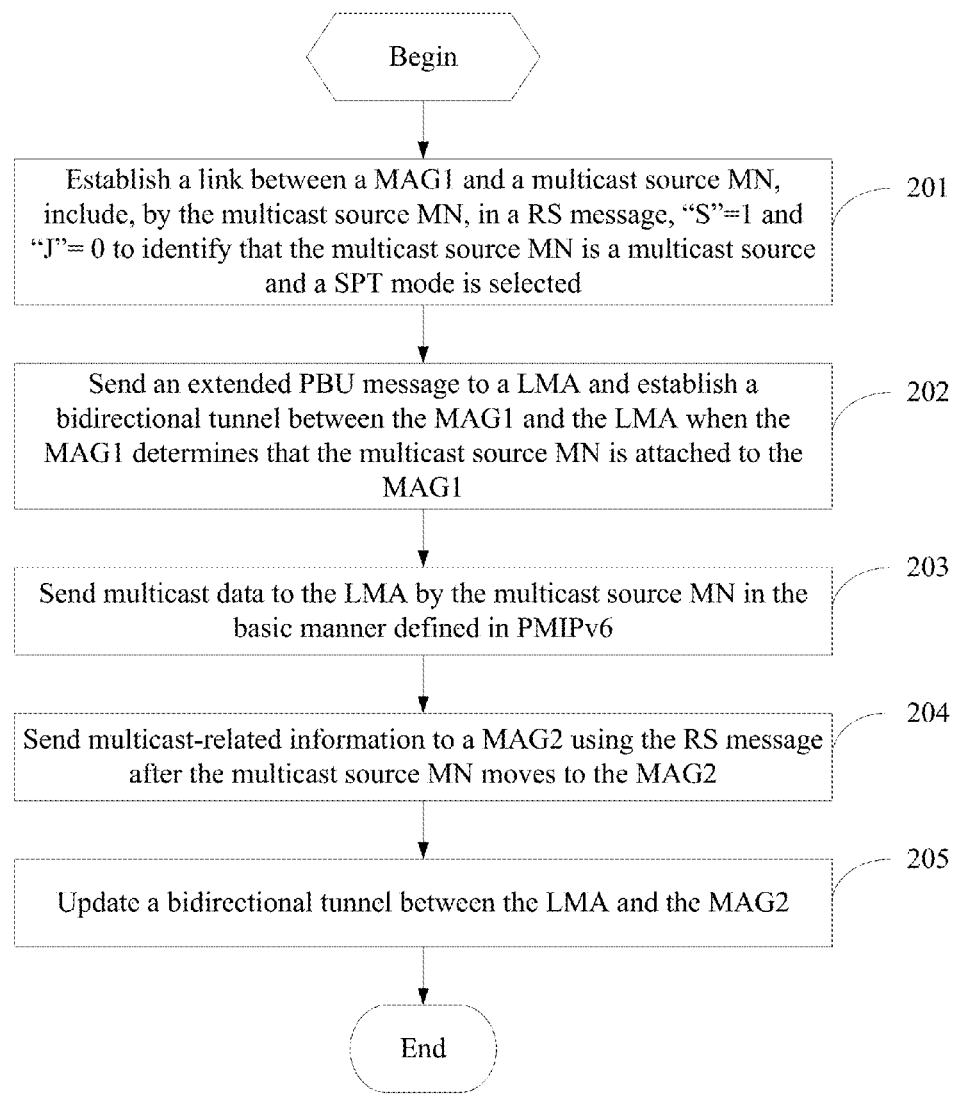
FIG. 2 is a flowchart of a handover of a multicast source to the PMIPv6 domain in an SPT mode in the prior art.

In order to give implementation solutions that are able to ensure the real-time and continuity of multicast service in PMIPv6 system, according to an embodiment of the present invention, there are provided a method for transmitting multicast data, a method for updating a multicast tree, and a system and a device thereof. A preferred embodiment of the present invention will be described in combination with accompanying drawings in the following, and it should be understood that the preferred embodiment described herein is only used to explain and interpret the present invention, but not to limit the present invention. The embodiment of the present application and the features in the embodiment may be combined with each other without conflicting.

First Embodiment

Firstly, according to a first embodiment of the present invention, it is provided a method for transmitting multicast data. The method can solve the problem that multicast interruption is too long when a mobile multicast source switches between two MAGs in a PMIPv6 system, so as to recover the multicast service as soon as possible. According to the first embodiment of the present invention, it is further provided a method for updating a multicast tree, which solves the problem of the pre-update of an SPT when a multicast source in the PMIPv6 system moves, and achieves the pre-updating of the SPT before the handover of the multicast source is completed under the premise that it is transparent to a multicast receiver.

The present invention can be applied to the scene of a multicast source MN switches in a same PMIPv6 system, for example, a multicast source MN moves from an MAG1, to which the multicast source MN is currently attached, to an MAG2, which is in the same PMIPv6 domain with the MAG1. Before the detailed description of the method for transmitting multicast data according to the first embodiment of the present invention, a post-handover multicast mode provided in the embodiment of the present invention is described in detail firstly, in which the post-handover multicast mode is a multicast mode adopted by the multicast source MN after it switches to the MAG2.

In the embodiment of the present invention, there are provided three types of post-handover multicast modes, which are:

a RPT mode;
an SPT without multicast tree update mode; and
an SPT with multicast tree pre-update mode.

The three types of post-handover multicast modes are described in detail in the following.

(1) RPT Mode

A multicast source MN transmits multicast data in a RPT mode after it accesses to an MAG1, that is, an LMA is used as a RP, the multicast data are sent firstly to the LMA and then are transmitted to each multicast receiver by the LMA. In this case, after switching to an MAG2, the multicast source MN still needs to use the RPT mode, that is, the multicast mode adopted by the multicast source MN after it accesses to the MAG2 is the RPT mode. In this mode, the MAG1 needs to transfer a RP address to the MAG2, and the MAG2 needs to construct a path to the RP.

In the RPT mode, before the multicast source establishes a connection between the multicast source and the MAG2 and completes processes such as binding updating, multicast data can be forwarded via a bidirectional tunnel established between the MAG1 and the MAG2, that is, multicast data are sent to a multicast receiving node corresponding to the multicast receiver along the following path:

Source (i.e., the multicast source)→MAG2→MAG1→LMA (RP)→multicast tree, along which the multicast data are transmitted to a multicast receiving node.

After the multicast source establishes the connection between the multicast source and the MAG2 and completes processes such as binding updating, multicast data are sent to a multicast receiving node corresponding to the multicast receiver along the following path:

Source→MAG2→LMA (RP)→multicast tree, along which the multicast data are transmitted to a multicast receiving node.

(2) SPT without Multicast Tree Update Mode

A multicast source MN transmits multicast data in an SPT mode after it accesses to an MAG1, and if the moving speed of the multicast source MN is great (for example, greater than a set threshold), the multicast source MN needs to transmit the multicast data in the SPT mode continually after it accesses to an MAG2, but does not need to update a multicast tree, the post-handover multicast mode is referred to as the SPT without multicast tree update mode.

In the SPT without multicast tree update mode, the multicast data can be forwarded via a bidirectional tunnel established between the MAG1 and the MAG2, that is, before or after the multicast source establishes a connection between the multicast source and the MAG2 and completes processes such as binding updating, the multicast data are sent to a multicast receiving node corresponding to a multicast receiver along the following path:

Source→MAG2→MAG1→multicast tree.

In the SPT without multicast tree update mode, the tunnel between the MAG1 and the MAG2 is not released as the multicast source establishes the connection between the multicast source and the MAG2 and completes processes such as binding updating, and the data sent by the multicast source are always transmitted to the multicast receiving node via the bidirectional tunnel. In this mode, frequent demolition, construction of a multicast tree caused by the fast handover among MAGs due to the great moving speed of the multicast source MN can be reduced, thereby the waste of network resource can be avoided and the efficiency of multicast forwarding can be improved.

(3) SPT and Multicast Tree Pre-Update Mode.

A multicast source MN transmits multicast data in an SPT mode in it accesses to an MAG1, and if the moving speed of the multicast source MN is slow (for example, not greater than the set threshold), the multicast source MN needs to transmit multicast data in the SPT mode continually after its handover to an MAG2, and needs to update a multicast tree at this time, the post-handover multicast mode is referred to as the SPT with multicast tree pre-update mode.

In this mode, the MAG1 needs to initiate a process of pre-updating the multicast tree on receipt of a response message of establishing a bidirectional tunnel returned by the MAG2. The process of pre-updating a multicast tree mainly includes: a multicast data packet sent by the MAG1 carries a multicast source handover option, which includes information such as a multicast source handover instruction and an address of the MAG2. As the multicast data packet is transmitted along the old multicast tree, the multicast source option announces to a router in the multicast tree the imminent multicast source handover, and the post-handover address of the MAG2, and thereby triggers the pre-updating of the multicast tree. Here, the old multicast tree refers to a multicast path for transmitting multicast data established after the multicast source MN accesses to the MAG1. When the updating of the multicast tree is completed, and after the multicast source MN completes processes such as binding updating at the MAG2, the multicast data are sent to a multicast receiving node along a new multicast tree. Here, the new multicast tree refers to a multicast path for transmitting multicast data established when the multicast source MN is accesses to the MAG2.

In the SPT with multicast tree pre-update mode, before the multicast source establishes a connection between the multicast source and the MAG2 and completes processes such as binding updating, the multicast data can be forwarded via a bidirectional tunnel established between the MAG1 and the MAG2, that is, the multicast data are sent to the multicast receiving node corresponding to the multicast receiver along the following path:

Source→MAG2→MAG1→multicast tree (the old multicast tree).

After the multicast source establishes the connection between the multicast source and the MAG2 and completes processes such as binding updating, the multicast data are sent to the multicast receiving node corresponding to the multicast receiver along the following path:

Source→MAG2→multicast tree (the new multicast tree).

Figure 3:
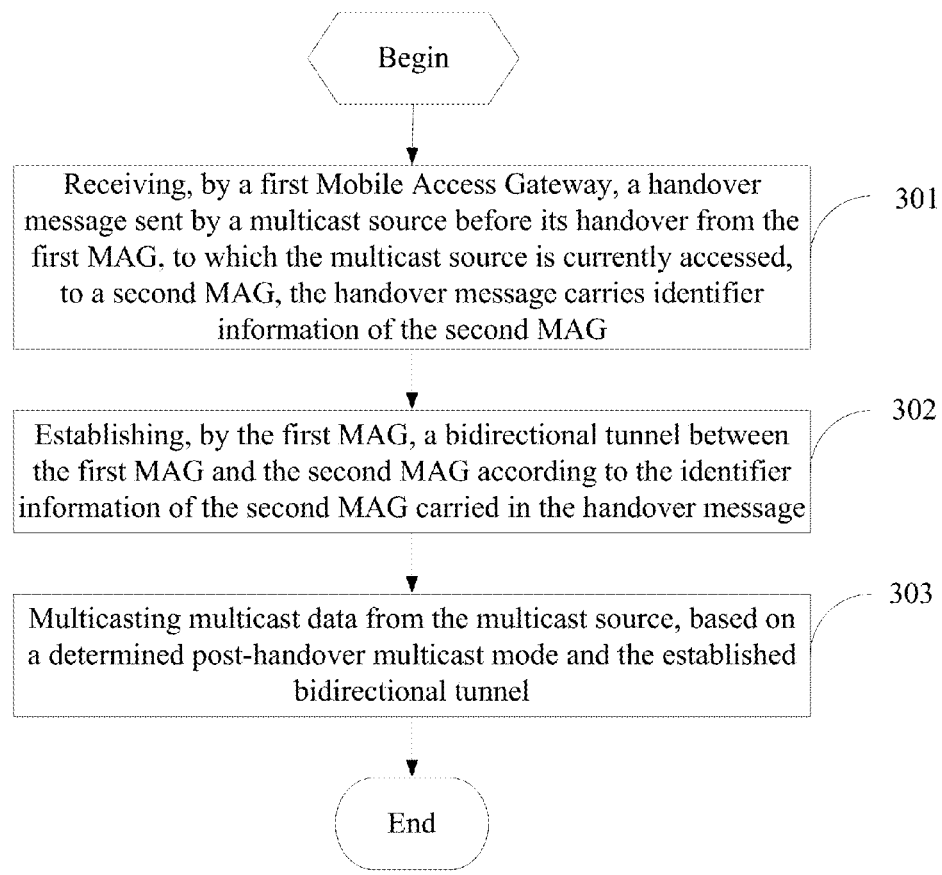
FIG. 3 is a flowchart of a method for transmitting multicast data according to a first embodiment of the present invention.

Based on the post-handover multicast modes defined above and the corresponding data transmission paths, a method for transmitting multicast data according to the first embodiment of the present invention is shown in FIG. 3, which mainly includes the following steps.

In step 301, an MAG1 receives a pre-handover message sent by a multicast source MN before the multicast source MN switches from the MAG1, to which the multicast source MN is currently accesses, to an MAG2, with the pre-handover message carrying identifier information of the MAG2.

In step 302, the MAG1 establishes a bidirectional tunnel between the MAG1 and the MAG2 according to the identifier information of the MAG2 carried in the pre-handover message.

In step 303, multicast data from the multicast source is multicasted based on a determined post-handover multicast mode and the established bidirectional tunnel.

In step 303, since the determined post-handover multicast modes are different, the ways of transmitting multicast data adopted are different. This process will be described in detail in the subsequent embodiment, and will not be described here.

At this point, the corresponding process of transmitting multicast data when the multicast source needs to switch among MAGs to which the multicast source is accessed due to moving ends.

Figure 4:
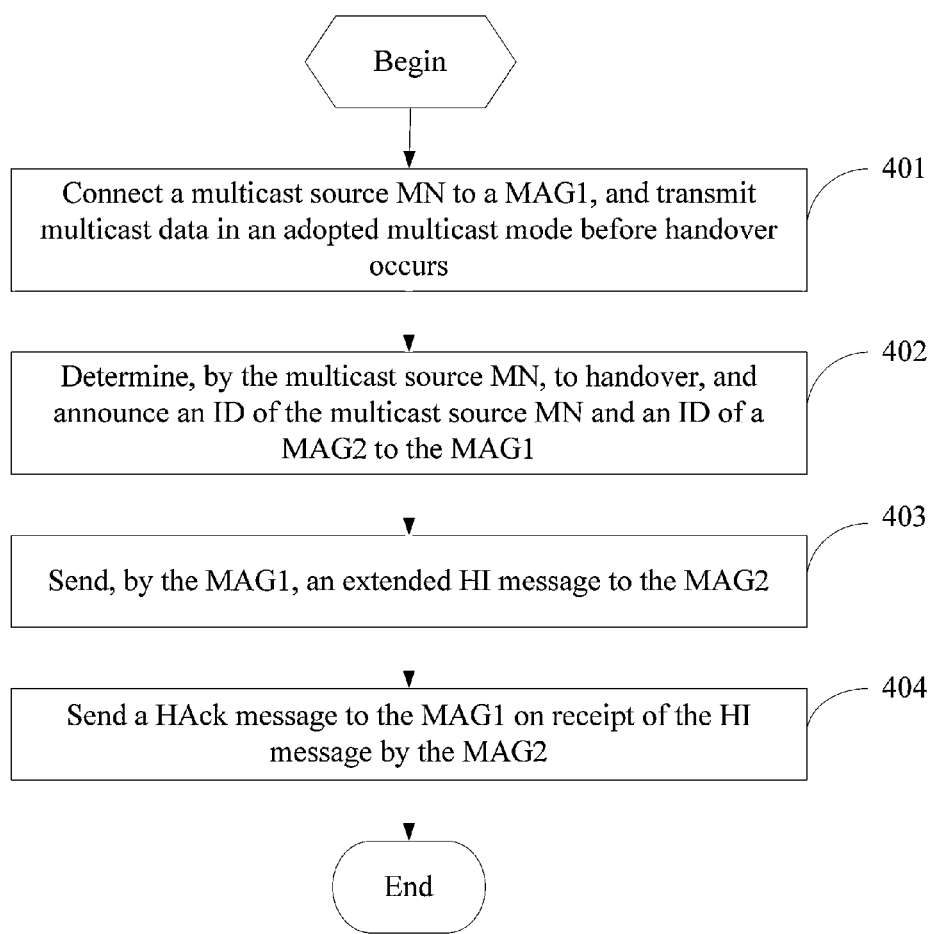
FIG. 4 is a flowchart of establishing a bidirectional tunnel between an MAG1 and an MAG2 according to the first embodiment of the present invention.

In practice, the process described above is mainly applied to the scene of transmitting multicast data when the multicast source MN needs to switch among MAGs due to the moving of the multicast source MN. Specifically, when the multicast source MN needs to switch from an MAG1 to an MAG2, a bidirectional tunnel needs to be established between the MAG1 and the MAG2. The procedure of establishing the bidirectional tunnel is shown in FIG. 4, which mainly includes the following steps.

In step 401, before a handover, a multicast source MN is accessed to the MAG1, and transmits multicast data in an adopted multicast mode.

In step 401, if the multicast data is transmitted in the RPT mode, the multicast data are sent to the MAG1 by the multicast source MN, and then transmitted to the LMA (which serves as a Rendezvous Point (RP)), and forwarded to a multicast receiver by the LMA; if the multicast data is transmitted in the SPT mode, the multicast data are forwarded directly to a multicast receiver by the multicast source according to a established SPT.

In step 402, the multicast source MN determines that a handover will happen, and notifies the MAG1 of an ID of the multicast source MN and an ID of an MAG2.

In step 402, the multicast source MN determines that a handover will happen, that is, determines to switch from the MAG1, to which the multicast source is currently accessed, to the MAG2, that is, the multicast source MN moves from a network coverage area where the MAG1 is located to a network coverage area where the MAG2 is located.

In step 403, the MAG1 sends an extended HI message (Handover Initiate Message) to the MAG2.

In step 403, the HI message sent by the MAG1 includes multicast source handover instruction information, an identifier of the multicast source, post-handover multicast mode instruction information, a multicast group address and a multicast source home address. Further, if the HI message indicates that the post-handover multicast mode is the RPT mode, the HI message further includes a RP address.

In step 404, the MAG2 sends a HAck message (Handover Acknowledge Message) to the MAG1 on receipt of the HI message.

In step 404, the HAck message includes an instruction indicates whether the MAG2 accepts the handover of the multicast source. In practical applications, the MAG2 may reject the handover of the multicast source due to reasons such as local strategy, not supporting the handover of the multicast source, and overloading and the like. If the MAG2 accepts the handover of the multicast source, a bidirectional tunnel between the MAG1 and the MAG2 is established.

At this point, the procedure of establishing the bidirectional tunnel between the MAG1 and the MAG2 ends.

Further, in a preferred embodiment of the present invention, if the post-handover multicast mode is the RPT mode, the MAG2, on receipt of the HI message sent by the MAG1, may pre-update the multicast path between the MAG2 and the LMA which corresponds to the RP according to the RP address included in the HI message. Due to pre-updating the multicast path between the MAG2 and the LMA, the multicast delay caused by the handover of the multicast source among MAGs is further reduced.

In the embodiment of the present invention, the HI message and the HAck message involved in the above procedures are extended messages, and the extending mode for the HI message and the HAck message will be described in detail in the following.

An instruction bit indicating that the handover is a multicast handover and is a multicast source handover is added into the extended HI message of the present invention. Furthermore, the extended HI message also includes the identifier of the multicast source MN and extended mobility options. The mobile options include: a post-handover multicast mode selecting bit (corresponding to one of the RPT mode, the SPT without multicast tree update mode and the SPT with multicast tree pre-update mode), the multicast group address (optional), the RP address (optional), and the multicast source home address (optional).

RFC5568 defines a solution for fast handover of a unicast node based on FMIPv6 protocol. The HI/HAck message is defined in the protocol to establish a tunnel between an old access router and a new access router and transmit context, such as the identifier of the multicast source MN and IPv4 home address and the like. IETF Mipshop task force has studied the fast handover solution in the PMIPv6, has extended the FMIPv6 protocol and has redefined the HI/HAck message. In the embodiment of the present invention, the HI/HAck message is further extended on this basis, for establishing the bidirectional tunnel between the MAG1 and the MAG2.

Specifically, the extending descriptions on the HI message and the HAck message are described below.

(1) Extending Description on the HI Message

The HI message is sent to the MAG2 by the MAG1, for initiating the handover of the multicast source MN.

The basic format of the HI message defined in the prior art is shown in FIG. 5, in which the corresponding fields are as follows:

| Field | Bit | Description |
| --- | --- | --- |
| S | 1 | New forward address requesting bit, which indicates that the destination is requested to return a new forward address if the bit is 1. (RFC5568) |
| U | 1 | Requesting buffer bit, which indicates that the destination is requested to buffer for the multicast source MN all the data sent to the multicast source MN when if bit is 1 (RFC5568) |
| P | 1 | Proxy bit, which is used to distinguish from the message defined in the RFC5568 (draft-ietf-mipshop-pfmipv6) |
| F | 1 | Request forwarding bit, which indicates that the destination is requested to forward data for the multicast source MN if the bit is 1. (draft-ietf-mipshop-pfmipv6) |

The basic format of the HI message extended based on the technical solution according to the embodiment of the present invention is shown in FIG. 6, the extended HI message is obtained by adding new flag bits M and R into the original HI message and adding a newly defined multicast source handover option into the Mobility Options. In which:

M-bit: indicates a mobile multicast handover request.
R-bit: indicates whether the handover is a handover of a multicast receiver or a handover of a multicast source.
M=0, R=0: fast handover of a unicast node;
M=1, R=1: fast handover of a multicast receiver node;
M=1, R=0: fast handover of a multicast source;
M=0, R=1: illegal.

According to the above-described definitions, in the HI message, when M=1, and R=0, which indicates that the handover is a handover of a multicast source. At this time, a newly defined multicast source handover options need to be added into the Mobility Options and are shown specifically in FIG. 7, which mainly include the following fields:

Option-Code (multicast option), which is used to represent a post-handover multicast mode. for example, it can be defined as follows: "0" which indicates that the post-handover multicast mode is the RPT mode, "1" which indicates that the post-handover multicast mode is the SPT without multicast tree update mode, and "2" which indicates that the post-handover multicast mode is the SPT with multicast tree pre-update mode;
Multicast Address;
Multicast Source Home Address, that is, the address used when the multicast source sends the multicast packet; and
RP Address, which exists when the Option-Code=0, that is, when a RPT mode is selected.

(2) Extending Description on the HAck Message

The HAck message is sent to the MAG1 by the MAG2, for replying to the HI message sent by the MAG1.

The basic format of the HAck message defined in the prior art is shown in FIG. 8, in which the corresponding fields are as follows:

| Fields | Bit | Description |
| --- | --- | --- |
| Code | 8 | Indicates whether to accept the handover request proposed in the HI message |
| Others | | Be the same as the corresponding fields in the HI message |

The basic format of the HAck message extended based on the technical solution according to the embodiment of the present invention is shown in FIG. 9, the extended HAck message is obtained by adding new flag bits M and R into the original HAck message to represent the response to the HI message. The definitions of the bits M and R in the extended HAck message are the same as the definitions of the bits M and R in the extended HI message and are not described again here.

In step 303 of the procedure described in FIG. 3, when the multicast data from the multicast source are multicasted based on the determined post-handover multicast mode and the established bidirectional tunnel, specific processes are also different according to different determined post-handover multicast modes. The processes will be described for the above-described three different multicast modes in detail in the following.

1. The Procedure of Transmitting Multicast Data if the Post-Handover Multicast Mode is the RPT Mode In the RPT mode, an MAG1 needs to transmit an address of an RP to an MAG2, and the MAG2 constructs a path to the RP. After a connection between a multicast source MN and the MAG2 is established and the processes such as binding updating and the like are completed, multicast data are transmitted to a multicast receiving node along the path: Source (i.e., multicast source)→MAG2→LMA (RP)→multicast tree.

Figure 10:
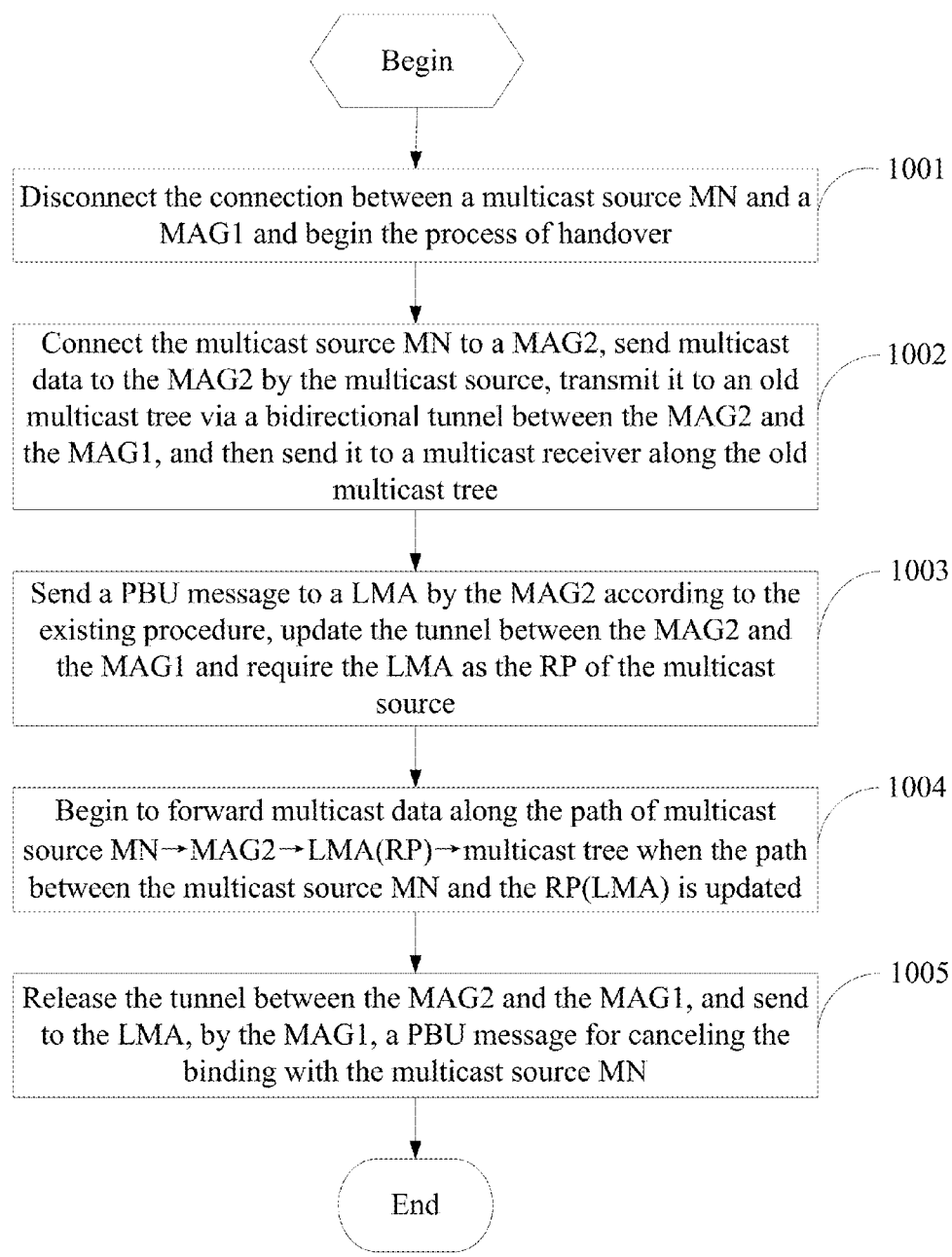
FIG. 10 is a flowchart of transmitting multicast data in a RPT mode according to the first embodiment of the present invention.

As shown in FIG. 10, the transmitting of the multicast data in the RPT mode mainly includes the following steps (this procedure can follow the procedure of establishing a bidirectional tunnel described above in FIG. 4).

In step 1001, the multicast source MN disconnects the connection between the multicast source MN and the MAG1 and begins the process of handover (i.e., the multicast source MN is accessed to the MAG2).

In step 1002, the multicast source MN is connected to the MAG2, and the multicast data are sent to the MAG2 by the multicast source MN, transmitted to the old multicast tree via the bidirectional tunnel between the MAG2 and the MAG1, and then sent to the multicast receiver along the old multicast tree.

Here, the old multicast tree refers to the multicast path for transmitting multicast data after the multicast source MN accesses to the MAG1.

In step 1003, the MAG sends a Proxy Binding Update message (PBU message) to the LMA according to the existing procedure, updates the tunnel between the MAG2 and the MAG1, and requests the LMA as the RP of the multicast source.

In step 1004, the path between the multicast source MN and the RP (LMA) is updated, and multicast data begin to be forward along the path of Source (i.e., multicast source)→MAG2→LMA (RP)→multicast tree.

In step 1005, the tunnel between the MAG2 and the MAG1 is released, and the MAG1 sends to the LMA a PBU message for canceling the binding between the MAG1 and the multicast source MN.

At this point, the procedure of transmitting multicast data in the RPT mode ends.

According to the above-described procedure, before the multicast path for multicasting multicast data after the multicast source MN is accessed to the MAG2 is established, that is, before the path between the multicast source MN and the RP (LMA) is updated, the MAG1 receives, via the established bidirectional tunnel, multicast data from the multicast source MN forwarded by the MAG2, and transmits the multicast data along the multicast path established after the multicast source access to the MAG1. After the multicast path for multicasting multicast data after the multicast source MN is access to the MAG2 is established, the multicast data are transmitted along the path between the MAG2 and the RP (LMA), and the bidirectional tunnel established between the MAG2 and the MAG1 is released.

Figure 11:
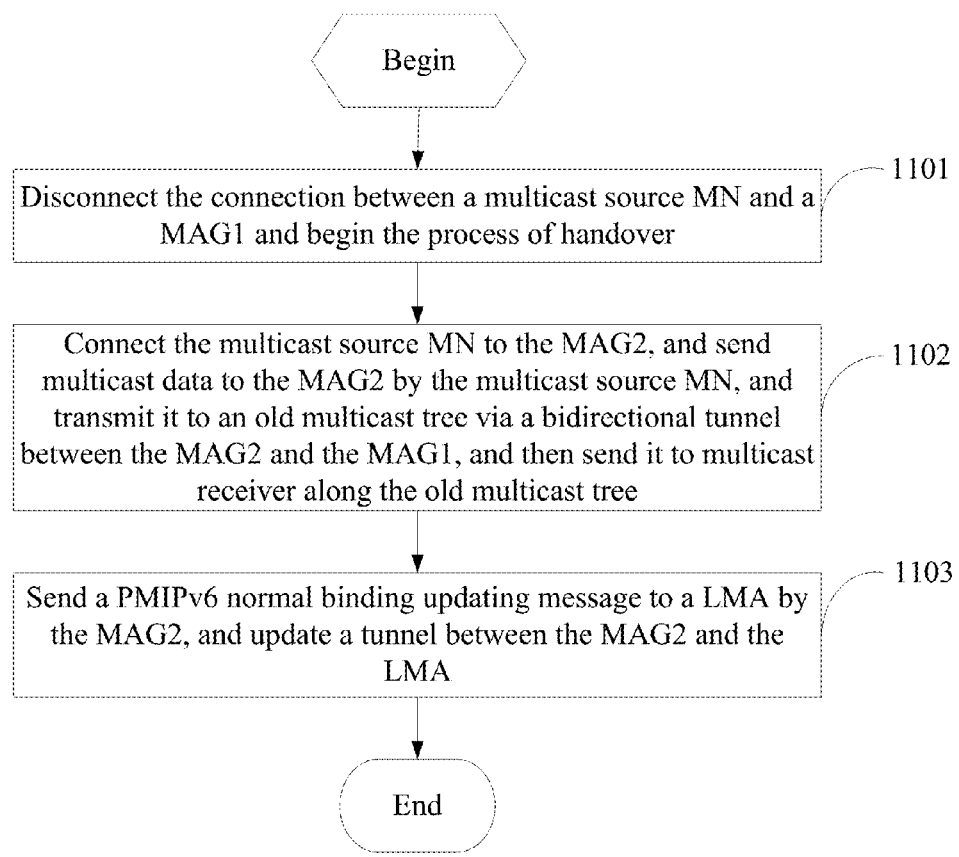
FIG. 11 is a flowchart of transmitting multicast data in an SPT without multicast tree update mode according to the first embodiment of the present invention.

2. The Procedure of Transmitting Multicast Data when the Post-Handover Multicast Mode is the SPT without Multicast Tree Update Mode As shown in FIG. 11, the transmitting of the multicast data in the SPT without multicast tree update mode mainly includes the following steps (this procedure can follow the procedure of establishing a bidirectional tunnel described above in FIG. 4).

In step 1101, the multicast source MN is disconnected from the MAG1 and begins the process of handover.

In step 1102, the multicast source MN is accessed to the MAG2, and multicast data are sent to the MAG2 by the multicast source MN, and transmitted to an old multicast tree via the bidirectional tunnel between the MAG2 and the MAG1, and then sent to the multicast receiver along the old multicast tree.

In step 1103, the MAG2 sends a PMIPv6 normal binding update message to the LMA, and updates the tunnel between the MAG2 and the LMA.

At this point, the tunnel between the MAG2 and the LMA is not released, data sent by the multicast source is always to be transmitted to the multicast receiving node along the path of Source (multicast source)→MAG2→MAG1→multicast tree.

In the SPT without multicast tree update mode, since the moving of the multicast source MN is fast, the MAG1 is always selected as a root node of the multicast tree, and keeps to establish a tunnel between the MAG1 and an MAG, to which the multicast source MN is newly accessed. When a handover of the multicast source MN happens again, that is, the multicast source MN switches from the MAG2 to an MAG3, the multicast source MN notifies the MAG1 of an address of the MAG3, the MAG1 re-establishes a bidirectional tunnel between the MAG1 and the MAG3, and transmits the multicast data from the multicast source MN forwarded by the MAG3. When the bidirectional tunnel between the MAG1 and the MAG3 is established by the MAG1, the bidirectional tunnel between the MAG1 and the MAG2 needs to be released.

In the SPT without multicast tree update mode, before and after the connection between the multicast source and the MAG2 is established and the processes such as binding updating and the like are completed, multicast data are sent to a multicast receiving node corresponding to a multicast receiver along the path of Source (multicast source)→MAG2→MAG1→the old multicast tree.

In the SPT without multicast tree update mode, there is no need to re-establish a multicast tree, and the operation of establishing a multicast tree is avoided.

Figure 12:
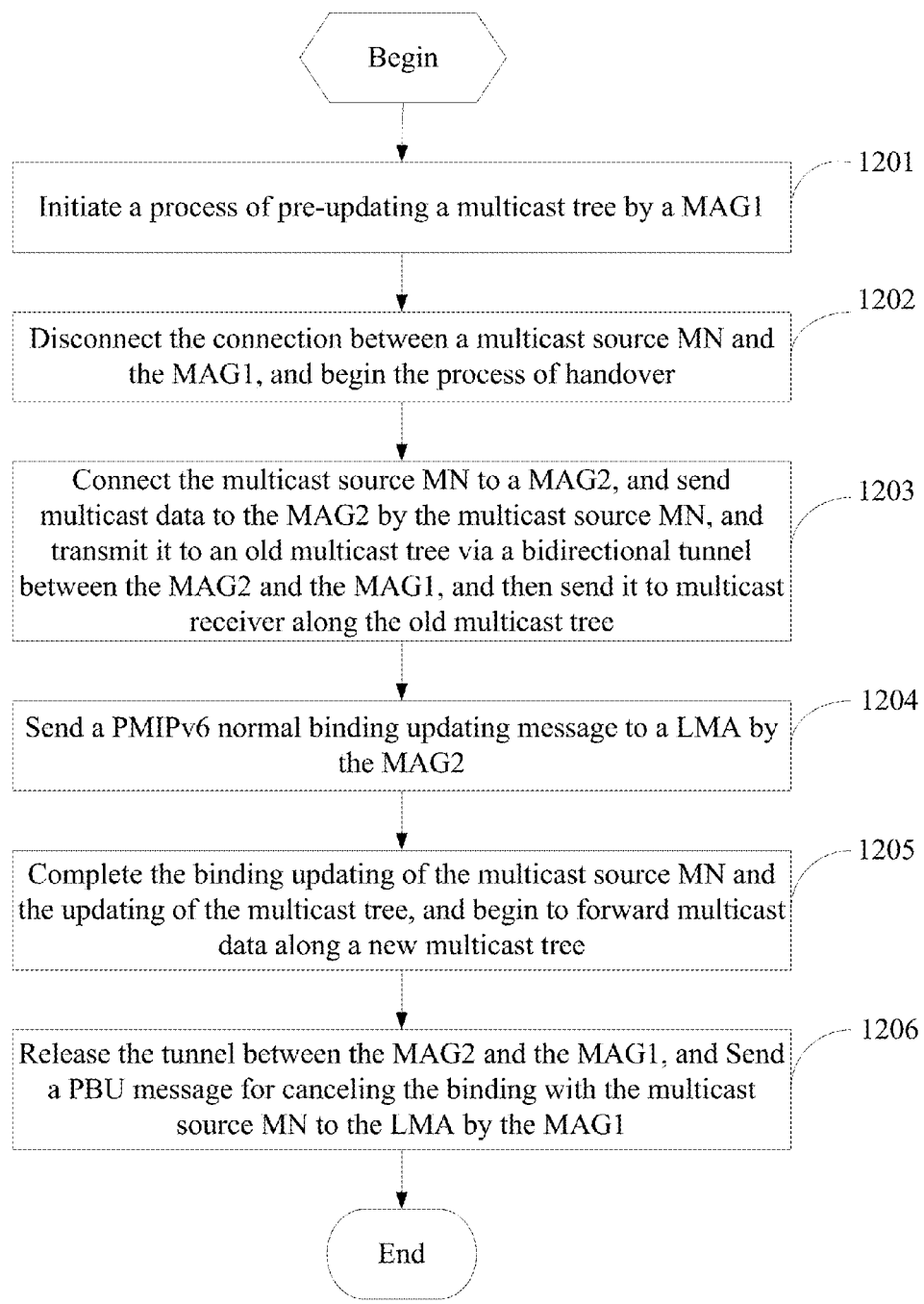
FIG. 12 is a flowchart of transmitting multicast data in an SPT with multicast tree pre-update mode according to the first embodiment of the present invention.

3. The Procedure of Transmitting Multicast Data if the Post-Handover Multicast Mode is the RPT with Multicast Tree Pre-Update Mode As shown in FIG. 12, the transmitting of the multicast data in the SPT with multicast tree pre-update mode mainly includes the following steps (this procedure can follow the procedure of establishing a bidirectional tunnel described above in FIG. 4).

In step 1201, the MAG1 initiates a process of pre-updating a multicast tree, which process will be described in detail in the subsequent embodiment and is not described here.

In step 1202, the multicast source MN is disconnected from the MAG1, and begins the process of handover.

In step 1203, the multicast source MN is accessed to the MAG2, and the multicast data are sent to the MAG2 by the multicast source MN, and transmitted to the old multicast tree via the bidirectional tunnel between the MAG2 and the MAG1, and then sent to the multicast receiver along the old multicast tree.

In step 1204, the MAG2 sends a PMIPv6 normal binding updating message to the LMA.

In step 1205, both of the binding updating of the multicast source MN and the updating of the multicast tree are completed, and the multicast data begins to be forwarded along the new multicast tree.

In step 1206, the tunnel between the MAG2 and the MAG1 is released, and the MAG1 sends to the LMA a PBU message for canceling the binding between the MAG1 and the multicast source MN.

At this point, the procedure of transmitting multicast data in the SPT with multicast tree pre-update mode ends.

According to the above-described procedure, before the multicast path for multicasting multicast data when the multicast source is accessed to the MAG2 is established, the MAG1 receives, via the established bidirectional tunnel, multicast data from the multicast source forwarded by the MAG2, and multicasts multicast data along the multicast path established after the multicast source accesses to the MAG1. Meanwhile, the procedure of pre-updating a multicast tree is performed, and after the multicast path for multicasting multicast data when the multicast source is accessed to the MAG2 is established, multicast data are transmitted along the new multicast path (i.e., the updated multicast tree).

The procedures of pre-updating a multicast tree involved in the embodiment of the present invention will be explained in detail in the following.

The process of pre-updating a multicast tree is initiated, by the MAG1, on receipt of the HAck message sent by the MAG2. That is, the MAG1 triggers the establishing of a multicast path for multicasting multicast data after the multicast source is accessed to the MAG2, that is, triggers the process of updating the multicast tree. Specifically, the MAG1 loads a data packet received via the bidirectional tunnel or a data packet sent directly by the multicast source with a multicast source handover instruction and an address of the MAG2, and sends the data packet carrying the multicast source handover instruction and the address of the MAG2 along the multicast path established after the multicast source is accessed to the MAG1 (i.e., the old multicast tree). Specifically, the multicast source handover instruction and the address of the MAG2 may be carried in IPv6 Hop-by-Hop Options Header of the data packet.

In the traditional PMIPv6, an IP address of a node does not change when the node moves in the PMIPv6 domain, therefore, a multicast source still uses its old IP address to send multicast data when the multicast source accesses to a new MAG. If a the method of Requirements-Driven, Explicitly Join to re-establish a multicast tree is used in the system, since the multicast node does not know that mobile node is switched, the Join message will not be re-sent, so there is no way to re-establish a multicast tree. But if a method of Data-Driven, Broadcast-Prune to re-establish a multicast tree is used in the system, the multicast data packet which is sent by a new MAG can not pass the RPF examination, so there is no way to re-establish a multicast tree. To solve this problem, according to the embodiment of the present invention, it is provided method for updating an SPT tree in the PMIPv6 environment.

Figure 13:
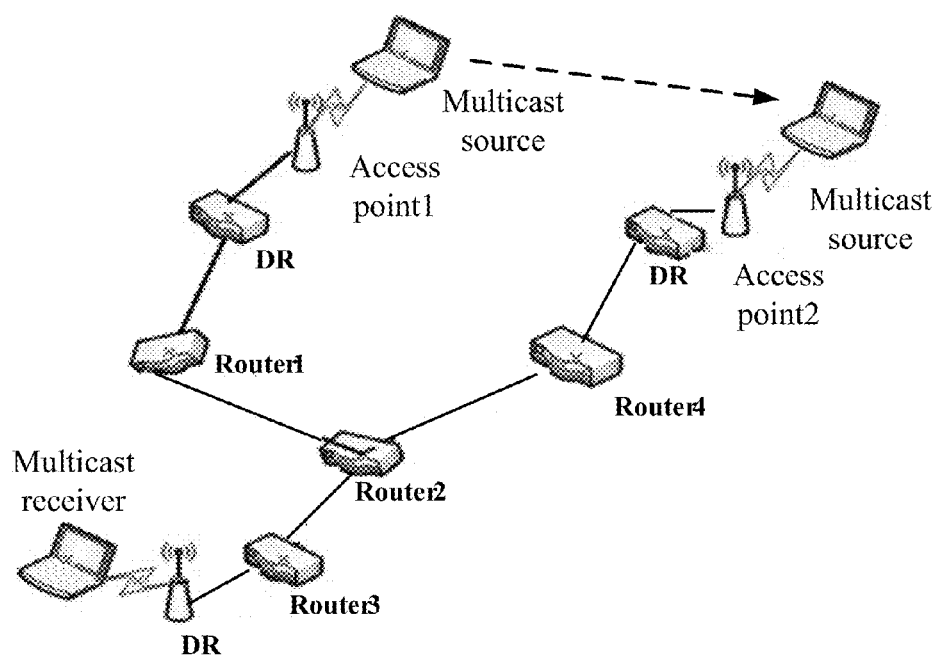
FIG. 13 is a schematic diagram of a multicast tree when a multicast source moves from an access point 1 to an access point 2 according to the first embodiment of the present invention.

FIG. 13 shows a multicast tree when a multicast source (source) moves from an access point1 to an access point2. Herein, a path of DR corresponding to the access point1→Router1→Router2→Router3→DR represents the multicast tree before the multicast source switches, that is, the multicast path when the multicast source is accesses to the access point1; a path of DR corresponding to the access point2→Router4→Router2→Router3→DR represents the pre-updated multicast tree, that is, the multicast path when the multicast source is accesses to the access point2. It can be seen from FIG. 13 that the routers related to a multicast tree can be classified into the following four categories:

1. A router which is in an old multicast tree but not in a new multicast tree, such as the Router1;
2. A router which is in an old multicast tree and also in a new multicast tree, but the interface for receiving multicast data changes, such as the Router2;
3. A router which is in an old multicast tree and also in a new multicast tree, but the interface for receiving multicast data does not change, such as the Router3; and
4. A router which is not in an old multicast tree but in a new multicast tree, such as the Router4.

According to the embodiment of the present invention, when the MAG1 obtains an acknowledgement message (HAck message) for supporting a handover of a multicast source from the MAG2, the MAG1 starts immediately the process of pre-updating a multicast tree, and without waiting the multicast source to establish a connection between the multicast source and the MAG2. The object of doing this is to update multicast tree as quickly as possible and reduce the time of updating the multicast tree. In the existing method, updating a multicast tree is bound to affect the use of the old multicast tree, and the new multicast tree may cause the old multicast tree to be discarded. This case is undesired for a multicast fast handover, because in the process of pre-updating multicast tree, it is still desired to transmit the multicast data along the old multicast tree, so as to reduce the interruption delay of multicast service.

In order to solve the above problems, in the technical solution provided according to the embodiment of the present invention, in the process of pre-updating multicast tree, data can be received from the old multicast tree. In order to achieve this object, in the present invention, the Routing Status (S, G) stored on the multicast router is extended so that the multicast routing corresponding to each multicast source has two interfaces for receiving multicast data:

an Active interface; and a pre-handover interface.

The Active interface is an interface for receiving multicast data before a handover, that is, the RPF interface from a router to the old access point of the multicast source, i.e., the MAG1. Here, the old access point refers to the MAG1 to which the multicast source MN accesses before the handover. In the process of pre-updating multicast tree, the router receives multicast data via the interface from the old multicast tree.

The pre-handover interface is a RPF interface from a router to the new access point of the multicast source, i.e., the MAG2. Here, the new access point refers to the MAG2 to which the multicast source MN is accesses after a handover. Before the handover, the pre-handover interface is set to null. In the pre-updating process, the pre-handover interface is set as a RPF interface from the router to the MAG2. It is indicated the new multicast tree begins to work if the multicast data arrives via the interface, and the pre-handover interface is upgraded to the Active interface.

Further, in the embodiment of the present invention, when a leaf router (i.e., a multicast node in a multicast tree) initiates a multicast Join request to the MAG2, since the IP address of the multicast source does not change, problems will occur if the Join message is sent in the conventional manner. In order to announce the routers along the path to forward the Join message to be sent to the MAG2, the leaf router needs to encapsulate the Join (S, G) message in a IP data packet whose destination address is the MAG2, and the options Header of the IP data packet also needs to carry a Hop-by-Hop Options Header including the multicast source handover option.

Figure 14:
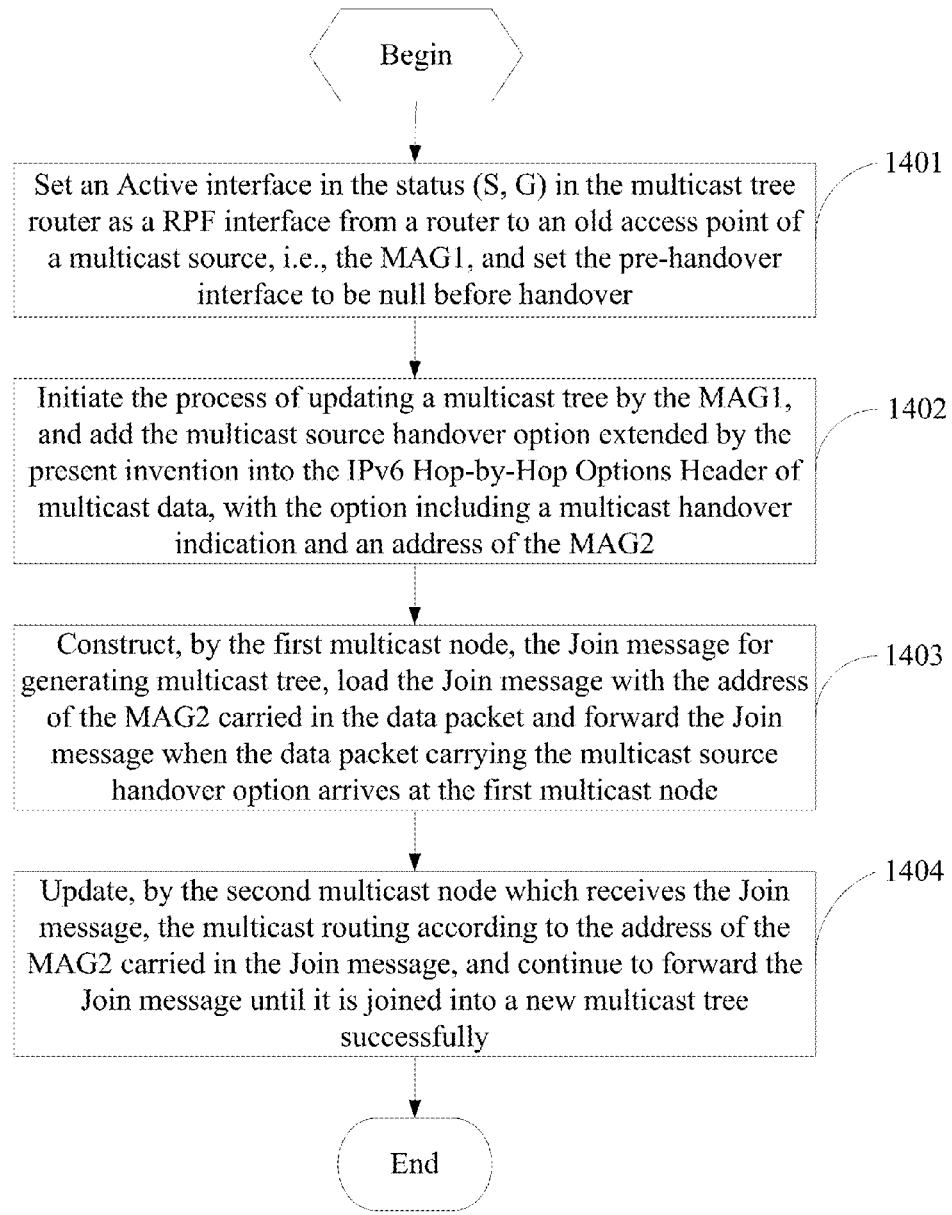
FIG. 14 is a flowchart of updating a multicast tree according to the first embodiment of the present invention.

As shown in FIG. 14, the specific process of updating a multicast tree mainly includes the following steps.

In step 1401, before a handover, the Active interface of the routing Status (S, G) stored on the multicast tree router is set as a RPF interface from a router to the old access point of the multicast source, i.e., the MAG1, and the pre-handover interface is set to null.

In step 1402, the MAG1 initiates the process of pre-updating multicast tree, and adds a multicast source handover option extended according to the present invention into the IPv6 Hop-by-Hop Options Header of multicast data, herein the option includes the multicast source handover instruction and the address of the MAG2 to which the multicast source is to be accessed.

In step 1402, the extended multicast source handover option will be explained in detail later, and is not described here.

In step 1403, when the data packet carrying the multicast source handover option arrives at the first multicast node, the first multicast node constructs the Join message for generating the new multicast tree, and loads the Join message with the address of the MAG2 carried in the data packet, so as to forward the address information of the second MAG.

In step 1404, the second multicast node which has received the Join message updates the multicast routing according to the address of the MAG2 carried in the Join message, and continues to forward the Join message until it is joined into a new multicast tree successfully, that is, the multicast node which has updated the multicast routing according to the address information of the MAG2 receives the Join message.

In step 1404, when the Join message arrives at the MAG2, if the multicast source MN has not been accessed to the MAG2, the MAG2 replaces the multicast source MN to process the Join message, the specific processes obey PIM-SM protocol (i.e., the content of RFC4601), and are not described here.

After the processes of the above-described steps are completed, a multicast tree is pre-established in the network, and the new access point of the multicast source, i.e. the MAG2, is used as a root in the multicast tree. In this pre-updated multicast tree, the pre-handover interfaces of all the routing Status (S, G) are set as a RPF interface from the router to the new access point of the multicast source, i.e., the MAG2.

At this point, the procedure of updating a multicast tree ends.

In step 1403 of the procedure shown in FIG. 14, the first multicast node loads the Join message with the address of the MAG2 so as to forward the address of the MAG2, specifically by the following processes:

the first multicast node encapsulates the Join message in the data packet whose destination address is the address of the MAG2, and the data packet carries the multicast source handover instruction; and the first multicast node forwards the data packet carrying the multicast source handover instruction according to a set upstream neighbor router address.

Figure 15:
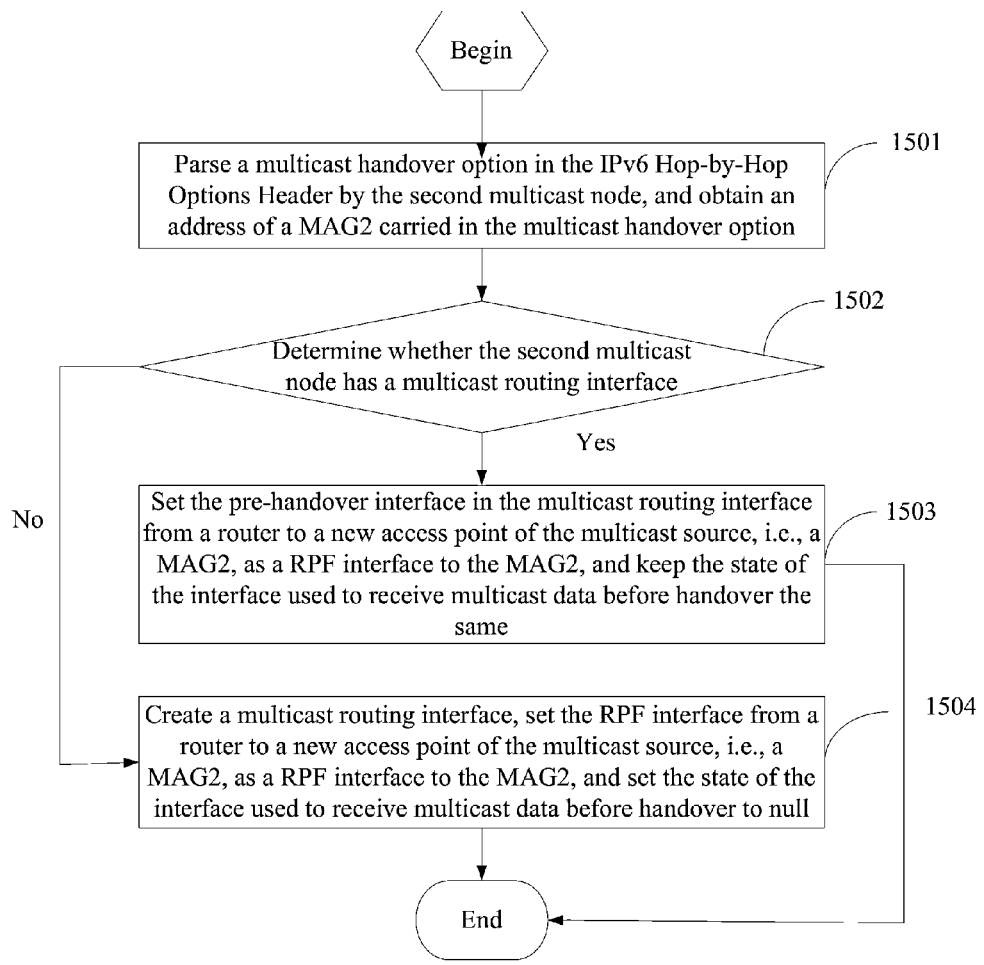
FIG. 15 is a flowchart of updating a multicast routing according to the first embodiment of the present invention.

In step 1404 of the procedure shown in FIG. 14, the second multicast node which has received the Join message updates the multicast routing according to the address of the MAG2 carried in the Join message That is, the second multicast node sets the pre-handover interface in the multicast Routing State as a RPF interface to the MAG2 according to the address of the MAG2 carried in the Join message. Specifically, the process of updating a multicast routing is shown in FIG. 15, and includes the following steps.

In step 1501, the second multicast node parses the multicast handover option in the IPv6 Hop-by-Hop Options Header, and obtains the address of the MAG2 carried in the multicast source handover option.

In step 1502, the second multicast node determines whether the second multicast node has a multicast routing state corresponding to the multicast service. If the second multicast node has the multicast routing state corresponding to the multicast service, a step 1503 is performed; and if the second multicast node itself has no multicast routing state corresponding to the multicast service, a step 1504 is performed.

In step 1502, if the determining result is yes, the router corresponds to the above-described type of Router 2 and Router 3, that is, a router which is in the old multicast tree and also in the new multicast tree; if the determining result is no, the router corresponds to the above-described type of Router 4, that is, a router which is not in the old multicast tree but in the new multicast tree, herein, the Router1 will not receive the Join message.

In step 1503, the pre-handover interface in the multicast routing state corresponding to the multicast service is set as a RPF interface to the MAG2, and the state of the Active interface keeps constant.

In step 1504, a multicast routing state corresponding to the multicast service is created, the pre-handover Interface in the multicast routing state is set as a RPF interface to the MAG2, and the state of the Active Interface is set to null.

At this point, the procedure of updating a multicast routing ends.

After the above-described procedure is completed, the second multicast node continues to forward the data packet in the direction of the MAG2. Specifically, the second multicast node forwards the Join data packet according to the set upstream neighbor router address.

Figure 16:
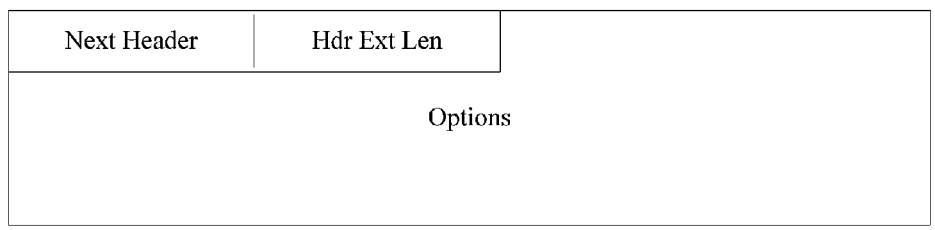
FIG. 16 is a schematic diagram of the format of an IPv6 Hop-by-Hop Options Header according to the first embodiment of the present invention.

The extended multicast source handover option involved in the procedure in FIG. 14 is carried in the Options Header of the IP data packet. Specifically, the IPv6 Hop-by-Hop Options Header is defined by RFC 2460, and the format of the Options Header is shown in FIG. 16, and in options field, the present invention defines the following new option:

a multicast source handover option.

The multicast source handover option indicates that the handover of the multicast source is about to happen, and the multicast source handover option includes the address of the new access point of the multicast source, i.e., the MAG2. Specifically, the multicast source handover option defined by the embodiment of the present invention is shown in FIG. 17, in which:

H indicates multicast source handover instruction;

New access point's Address indicates the address of a new access point MAG2 of the multicast source.

The other fields have the same meanings as the existing fields, and are not described here.

During the execution of the procedure described in FIG. 14, multicast data always arrive at the multicast receiving node along the old multicast tree. When the multicast source completes the operations such as binding updating at the MAG2 and the like, multicast data begins to be forwarded along the new multicast tree. That is, multicast data begins to arrive at each router via the pre-handover interface in routing States (S, G).

When a router on a new multicast tree receives multicast data via the pre-handover interface for the first time, it is proved that the new multicast tree begins to come into use, multicast router needs to be further updated, the specific process is shown in FIG. 18, and includes the following steps.

In step 1801, it is determined whether the Active Interface in multicast routing state is null. If the Active Interface in multicast routing state is null, a step 1804 is performed; and if the Active Interface in multicast routing state is not null, a step 1802 is performed.

In step 1801, if the determining result is yes, the router corresponds to the above-described type of Router4, that is, a router which is not in an old multicast tree but in a new multicast tree.

In step 1802, it is determined whether the Active Interface in the multicast routing state is the same as the pre-handover interface. If the Active Interface in the multicast routing state is the same as the pre-handover interface, the step 1804 is performed; and if the Active Interface in multicast routing state is not the same as the pre-handover interface, a step 1803 is performed.

In step 1802, if the determining result is yes, the router corresponds to the above-described type of Router3, that is, the router which is in an old multicast tree and also in a new multicast tree; and if the determining result is no, the router corresponds to the above-described type of Router2, that is, a router which is in an old multicast tree and also in a new multicast tree.

In step 1803, a Pruning message is sent to the direction of the Active Interface, and the router is cut off from the multicast tree.

In step 1804, the state of the Active Interface is set according to the state of the pre-handover interface, and the state of the pre-handover interface is set to null.

At this point, an alternation between the new multicast tree and the old multicast tree is completed, and multicast data are forwarded along the new multicast tree.

From the procedure described in FIG. 18, after the second multicast node updates the multicast routing according to the address of the MAG2 carried in the Join message, and the data is received via the pre-handover interface for the first time, the pre-handover interface is upgraded as the Active Interface (that is, the state of the Active Interface is set according to the state of the pre-handover interface), and the state of pre-handover interface is set to be null, when it is determined that the state of the Active Interface is null or that the state of the Active Interface is the same as the pre-handover interface.

According to the above-described technical solution provided in the embodiment of the present invention, it is necessary to perform improvements on the MAG1 (an MAG accessed to before a handover of a multicast source), the MAG2 (an MAG accessed to after the handover of the multicast source) and a multicast router during the process of updating the multicast tree. Specifically, the operations on the MAG1, the MAG2 and the multicast router are described respectively as followings.

1. The Operations on the MAG1 Mainly Include the Following Several Aspects:

(1) The MAG1 extracts an ID of the multicast source MN and an ID of the MAG2 on reception of a handover message sent by the multicast source MN. A post-handover multicast mode of the multicast source is determined, and a multicast group address, a RP address (when a RPT mode is selected), a multicast source home address and the like are prepared for transmitting.

(2) The MAG1 sends to the MAG2 an extended HI message, in which the indicating bits M=1, R=0 denote that the handover is the multicast handover and is the multicast source handover. Additionally, the extended HI message also includes the ID of the multicast source MN and an extended mobile option. The extended mobile option includes a post-handover multicast mode selecting bit, the multicast group address, the RP address (when the RPT mode is selected), the multicast source home address and the like.

(3) The MAG1 receives a HAck message returned from the MAG2 and establishes a bidirectional tunnel for transmitting multicast data between the MAG1 and the MAG2.

(4) The MAG1 receives multicast data forwarded by the MAG2 via the bidirectional tunnel, and forwards the multicast data in the multicast mode before handover.

(5) The MAG1 performs different operations according to different post-handover multicast modes.

In the RPT mode, after the multicast tree of the multicast source at a new position is updated, the MAG1 releases the bidirectional tunnel between the MAG1 and the MAG2 on reception of a notice from the MAG2, and sends to an LMA a PBU message for releasing the binding with the multicast source MN.

In the SPT without multicast tree update mode, the tunnel between the MAG1 and the MAG2 is not released, and the data which is sent from the multicast source is transmitted to a multicast receiving node along the path of source→MAG2→MAG1→multicast tree. Since the moving speed of the multicast source is fast, the MAG1 is used as a root node of the multicast tree and keeps the tunnel between the MAG1 and the new access point of the multicast source MN, i.e., the MAG2. When the multicast source MN moves for the second time, the third time . . . , the multicast source MN notifies the MAG1 of the address of the next access point via the existing tunnel. The MAG1 establishes a tunnel between the MAG1 and the new access point MAG of the multicast source MN, and multicast data are transmitted to the MAG1 via the new tunnel, and then transmitted to the multicast tree. The tunnel between the MAG1 and the last access point of the multicast source MN is released.

In the SPT with multicast tree pre-update mode, the MAG1 initiates a process of pre-updating a multicast tree. The MAG1 adds a multicast source handover option extended according to the present invention into an IPv6 Hop-by-Hop Options Header of multicast data, and the option includes the multicast source handover instruction and the address of the MAG2 to which the multicast source will access. After the multicast tree of the multicast source at a new position is updated, the MAG1 releases the bidirectional tunnel between the MAG1 and the MAG2 on reception of a notice from the MAG2, and sends to a LMA a PBU message for releasing the binding with the multicast source MN.

2. The Operations on the MAG2 Mainly Include the Following Several Aspects:

(1) The MAG2 receives the HI message sent by the MAG1, determines that the handover is a multicast source handover, and extracts information such as the post-handover multicast mode information, the multicast group address, the RP address (when the RPT mode is selected), and the multicast source home address carried in the HI message. The MAG2 determines whether to support the multicast handover according to the local policy, determines whether to accept the handover according to the burden of the MAG2.

(2) The MAG2 sends to the MAG1 the HAck message including the information on whether the MAG2 accepts the handover of the multicast source. If the MAG2 accepts the handover, the MAG2 establishes the bidirectional tunnel between the MAG2 and the MAG1.

(3) When the multicast source MN is connected to the MAG2, multicast data which is sent by the multicast source MN is received by the MAG2, and then is transmitted to the MAG1 via the bidirectional tunnel between the MAG2 and the MAG1.

(4) The MAG2 performs different operations according to different post-handover multicast modes.

In the RPT mode, the MAG2 transmits an extended binding updating message to an LMA to request that the LMA acts as the RP of the multicast source. After the process of binding updating is completed, the MAG2 notifies the MAG1 to stop the forwarding of multicast data, and releasing the bidirectional tunnel between the MAG1 and the MAG2.

In the SPT without multicast tree update mode, the MAG2 transmits a PMIPv6 normal binding updating message to the LMA. Since the moving speed of the multicast source is fast, the tunnel between the MAG1 and the MAG2 is not released, and the data which is sent from the multicast source is transmitted to a multicast receiving node along the path of source→MAG2→MAG1→multicast tree. When the multicast source MN moves again, the MAG2 notifies the MAG1 of the address of the new access point MAG of the multicast source MN via the tunnel between the MAG1 and the MAG2. After the tunnel between the MAG1 and the new access point MAG is established, the existing tunnel between the MAG1 and the MAG2 is released.

In the SPT with multicast tree pre-update mode, the MAG2 transmits a PMIPv6 normal binding updating message to the LMA. The multicast tree receives a special Join message during the process of updating, and if the multicast source MN is not accessed to the MAG2 at this time, the MAG2 replaces the multicast source MN to process the Join message. After the multicast tree is updated, multicast data begins to be forwarded along the new multicast tree. The MAG2 notifies the MAG1 to stop the forwarding of multicast data and releases the bidirectional tunnel between the MAG1 and the MAG2.

3. The Operations on the Multicast Router During the Process of Multicast Tree Pre-Updating Mainly Include the Following Several Aspects:

(1) Before handover, the Active interface of the (S, G) in the multicast tree router is set as a RPF interface from the router to the old access point MAG1 of the multicast tree, and the pre-handover interface is set to null.

(2) When a leaf node router (corresponding to a multicast node) receives multicast data which carries the multicast source handover option sent by the MAG1, the leaf node router needs to parse the multicast source handover option, extract the address of the MAG2, construct a Join (S, G) message and encapsulates the Join (S, G) message in an IP data packet whose destination address is the address of the MAG2. The multicast source handover option is carried in the IPv6 Hop-by-Hop Options Header of the IP data packet. Finally, the leaf node router sends the Join message encapsulated in the IP packet along the direction of the MAG2.

(3) When a router along the way of the IP packet receives the Join message encapsulated in the IP packet, the router updates its multicast routing, receives a reply for the Join message returned from the MAG2. In the network, a multicast tree where the new access point MAG2 acts as a root. In the pre-updated multicast tree, the pre-handover interfaces of all router (S, G) states are set as a RPF interface from the router to the new access point MAG2 of the multicast tree.

(4) During the process of multicast tree pre-update, multicast data are received and forwarded through the Active interface. After the MAG2 completes the operations such as binding updating, the multicast source begins to forward multicast data along the new multicast tree, that is, multicast data begins to arrive at each router through the pre-handover interface in the (S, G) state.

(5) When the router on the new multicast tree receives multicast data through the pre-handover interface for the first time, it accounts for that the new multicast tree comes into use and the multicast routing is further updated.

After the alternation between the new and old multicast trees is completed, the router needs to forward multicast data along the new path.

Second Embodiment

Figure 19:
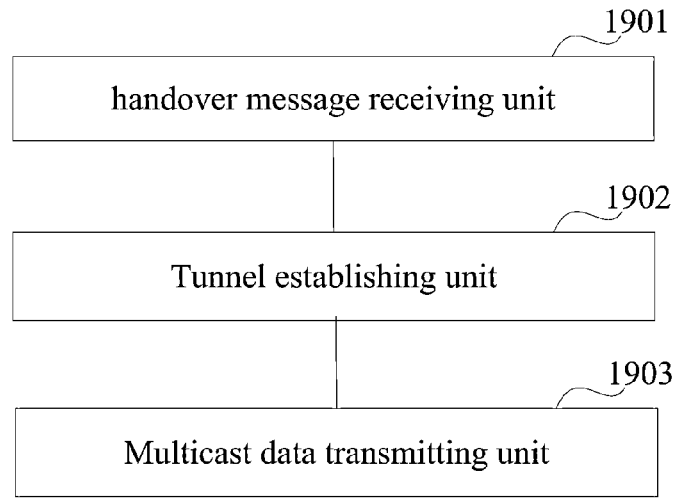
FIG. 19 is a first schematic diagram of a device for transmitting multicast data according to a second embodiment of the present invention.

According to the second embodiment of the present invention, it is provided a device for transmitting multicast data, as shown in FIG. 19, and the device includes:

a pre-handover message receiving unit 1901, a tunnel establishing unit 1902, and a multicast data transmitting unit 1903.

In which:

a handover message receiving unit 1901 is adapted to receive a handover message sent by a multicast source before handover of the multicast source from a first Mobile Access Gateway (MAG), to which the multicast source is currently accessed, to a second MAG, herein, the handover message carries identifier information of the second MAG;

a tunnel establishing unit 1902 is adapted to establish a bidirectional tunnel with the second MAG according to the identifier information of the second MAG carried in the handover message received by the handover message receiving unit 1901; and a multicast data transmitting unit 1903 is adapted to multicast data from the multicast source, based on a determined post-handover multicast mode and the bidirectional tunnel established by the tunnel establishing unit 1902, herein, the post-handover multicast mode is a multicast mode adopted by the multicast source after the handover to the second MAG.

In a preferred example according to the second embodiment of the present invention, the tunnel establishing unit 1902 included in the device shown in FIG. 19 is adapted to:

send a Handover Initiate (HI) message to the second MAG, and establish the bidirectional tunnel with the second MAG on receipt of a Handover Acknowledge (HAck) message sent by the second MAG.

In a preferred example according to the second embodiment of the present invention, the tunnel establishing unit 1902 included in the device shown in FIG. 19 is adapted to:

send the HI message including multicast source handover instruction information, an identifier of the multicast source identifier and post-handover multicast mode instruction information to the second MAG.

In a preferred example according to the second embodiment of the present invention, the tunnel establishing unit 1902 included in the device shown in FIG. 19 is adapted to:

send, to the second MAG, the HI message further including a multicast group address and a multicast source home address, herein, the HI message further includes a multicast Rendezvous Point (RP) address in the case that the HI message indicates that the multicast mode is a Rendezvous Point Tree (RPT) mode.

In a preferred example according to the second embodiment of the present invention, the multicast data transmitting unit 1903 included in the device shown in FIG. 19 is adapted to:

determine a multicast mode adopted by the multicast source when the multicast source is accessed to the first MAG; and determine the post-handover multicast mode is an RPT mode, if it is determined that the multicast mode adopted by the multicast source when the multicast source is accessed to the first MAG is the RPT mode;

determine the post-handover multicast mode is an SPT without multicast tree update mode, if it is determined that the multicast mode adopted by the multicast source when the multicast source is accessed to the first MAG is an SPT mode and that a moving speed of the multicast source is greater than a set threshold; and determine the post-handover multicast mode is an SPT with multicast tree pre-update mode, if it is determined that the multicast mode adopted by the multicast source when the multicast source is accessed to the first MAG is the SPT mode and that a moving speed of the multicast source is not greater than the set threshold.

In a preferred example according to the second embodiment of the present invention, the multicast data transmitting unit 1903 included in the device shown in FIG. 19 is adapted to:

in the case where the determined post-handover multicast mode is the RPT mode or the SPT with multicast tree pre-update mode: receive, via the established bidirectional tunnel, before a multicast path for multicasting data when the multicast source is attached to the second MAG is established, data from the multicast source that are forwarded by the second MAG; and multicast the data along a multicast path established after the multicast source attaches to the first MAG;

in the case where the determined post-handover multicast mode is an SPT without multicast tree update mode: receive, via the established bidirectional tunnel, data from the multicast source that are forwarded by the second MAG, and multicast the data along the multicast path established after the multicast source attaches to the first MAG.

Figure 20:
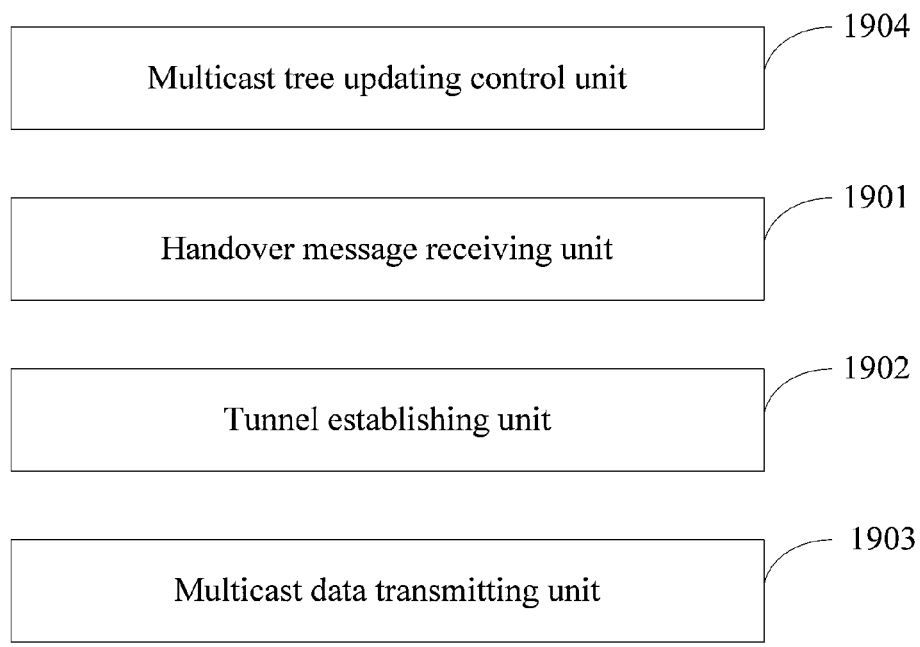
FIG. 20 is a second schematic diagram of a device for transmitting multicast data according to the second embodiment of the present invention.

As shown in FIG. 20, in a preferred example according to the second embodiment of the present invention, the device shown in FIG. 19 may further include:

a multicast tree updating control unit 1904, for triggering, after the HAck Message sent by the second MAG is received, along a multicast path established after the multicast source attaches to the first MAG and an address of the second MAG, to establish a multicast path for multicasting data when the multicast source is attached to the second MAG, in case where the determined post-handover multicast mode is an SPT with multicast tree pre-update mode.

In a preferred example according to the second embodiment of the present invention, the multicast tree updating control unit 1904 included in the device shown in FIG. 20 is adapted to:

load a data packet sent by the multicast source with a multicast source handover instruction and the address information of the second MAG, and send the data packet carrying the multicast source handover instruction and the address information of the second MAG to a multicast node in the multicast path established after the multicast source accesses to the first MAG.

In a preferred example according to the second embodiment of the present invention, the multicast tree updating control unit 1904 included in the device shown in FIG. 20 is adapted to:

load an IPv6 Hop-by-Hop Options Header of the data packet sent by the multicast source with the multicast source handover instruction and the address information of the second MAG.

Figure 21:
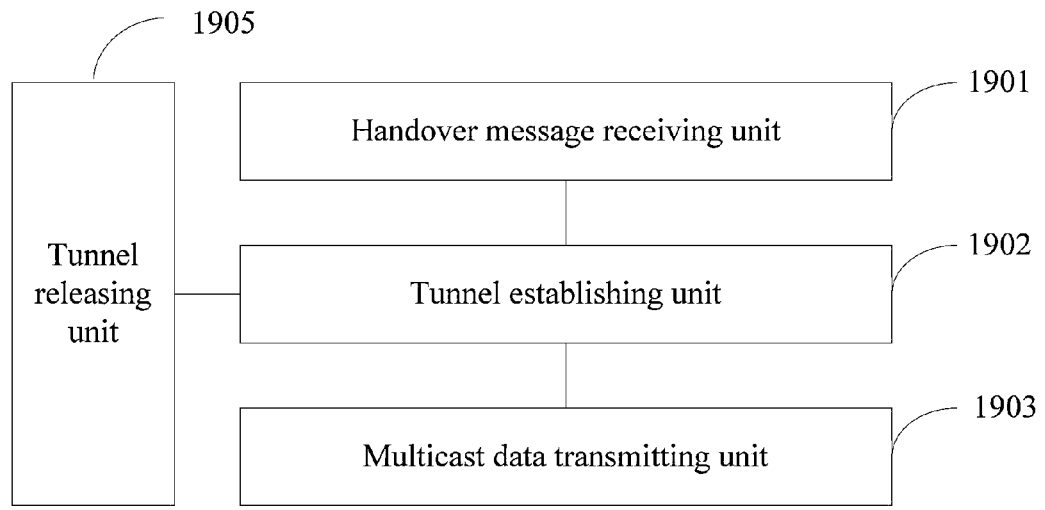
FIG. 21 is a third schematic diagram of a device for transmitting multicast data according to the second embodiment of the present invention.

As shown in FIG. 21, in a preferred embodiment according to the second embodiment of the present invention, the device shown in FIG. 19 may further include:

a tunnel releasing unit 1905, adapted to receive a bidirectional tunnel releasing instruction sent by the second MAG, and release the bidirectional tunnel between the first MAG and the second MAG according to the bidirectional tunnel releasing instruction, after a multicast path for multicasting data when the multicast source is accessed to the second MAG is established, in the case that the determined post-handover multicast mode is the RPT mode or the SPT with multicast tree pre-update mode.

It should be understood that a unit included in the above device for transmitting multicast data is only a logic division according to the function implemented by the device, and in practical application, the above-described units can be superposed or separated. Moreover, the function implemented by the device according to this embodiment one-to-one corresponds to the procedure of the method for transmitting multicast data according to the above-described first embodiment, the procedure of more detailed processing implemented by the device has been described in detail in the above-described first embodiment, and is not described in detail here.

Third Embodiment

Figure 22:
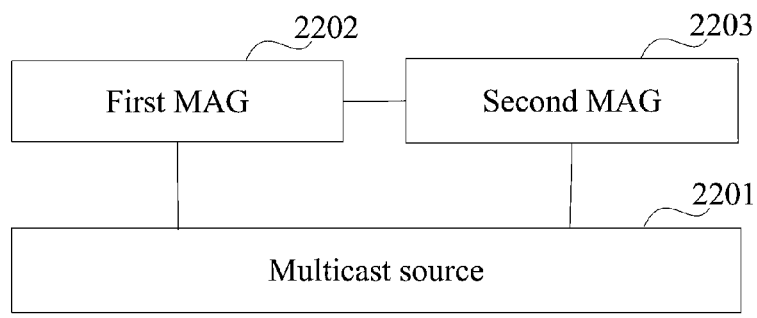
FIG. 22 is a schematic diagram of a system for transmitting multicast data according to a third embodiment of the present invention.

According to the third embodiment of the present invention, it is provided a system for transmitting multicast data, as shown in FIG. 22, and the system mainly includes:

a multicast source 2201, a first Mobile Access Gateway (MAG) 2202 and a second MAG 2203.

The multicast source 2201 is adapted to send a handover message to the first MAG before handover of the multicast source from the first MAG, to which the multicast source is currently accessed, to the second MAG, herein, the handover message carries identifier information of the second MAG.

The first MAG 2202 is adapted to establish a bidirectional tunnel between the first MAG and the second MAG according to the identifier information of the second MAG carried in the handover message sent by the multicast source 2201, and to multicast data from the multicast source based on a determined post-handover multicast mode and the established bidirectional tunnel, the post-handover multicast mode is a multicast mode adopted by the multicast source after the handover of the multicast source to the second MAG.

It should be understood that the function implemented by the first MAG included in the above system for transmitting multicast data corresponds to the device for transmitting multicast data according to the above-described second embodiment. The procedure of more detailed processing implemented by the first MAG has been described in detail in the above-described second embodiment, and is not described in detail here.

Fourth Embodiment

Figure 23:
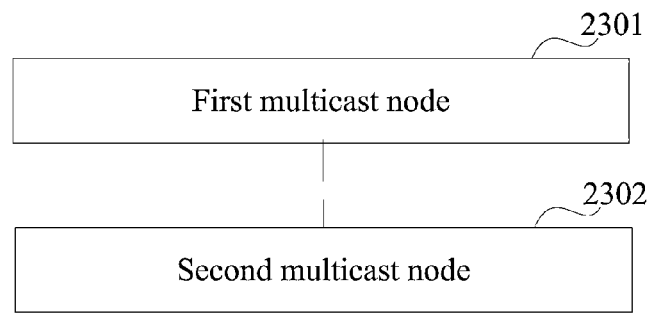
FIG. 23 is a schematic diagram of a system for updating a multicast tree according to a fourth embodiment of the present invention.

According to the fourth embodiment of the present invention, it is provided a system for updating a multicast tree, as shown in FIG. 23, and the system mainly includes:

a first multicast node 2301 and a second multicast node 2302;

in which:

the first multicast node 2301 is adapted to receive a data packet sent by a first Mobile Access Gateway (MAG), to construct a Join message for generating a multicast tree if it is determined that a multicast source handover instruction is carried in the data packet, to load the Join message with address information of a second MAG carried in the data packet so as to forward the address information of the second MAG; and the second multicast node 2302 is adapted to receive the Join message forwarded by the first multicast node 2301, to update a multicast routing according to the address information of the second MAG carried in the Join message, and to continue forwarding the Join message until the multicast node receives the Join message after the multicast node updates the multicast routing according to the address information of the second MAG.

In a preferred example according to a fourth embodiment of the present invention, the first multicast node 2301 included in the system shown in FIG. 23 is adapted to:

encapsulate the Join message in a data packet whose destination address is the address of the second MAG, load the data packet with the multicast source handover instruction, and forward the data packet carrying the multicast source handover instruction according to a set upstream neighbor router address.

In an preferred example according to the fourth embodiment of the present invention, the second multicast node 2302 included in the system shown in FIG. 23 is adapted to:

set a Pre-handover Interface in a multicast routing state corresponding to the multicast service as a Reverse Path Forwarding (RPF) interface to the second MAG, according to the address information of the second MAG carried in the Join message.

In a preferred example according to the fourth embodiment of the present invention, the second multicast node 2302 included in the system shown in FIG. 23 is adapted to:

determine whether the second multicast node itself has a multicast routing state corresponding to the multicast service; and set the Pre-handover Interface in the multicast routing state as a RPF interface to the second MAG, if it is determined that the second multicast node itself has the multicast routing state corresponding to the multicast service; or create a multicast routing state, set a Pre-handover Interface in the multicast routing state as a RPF interface to the second MAG, and set the state of an Active Interface in the multicast routing state to null, if it is determined that the second multicast node itself has no multicast routing state corresponding to the multicast service.

In a preferred example according to the fourth embodiment of the present invention, the second multicast node 2302 included in the system shown in FIG. 23 is further adapted to:

in the case that the multicast routing is updated according to the address information of the second MAG carried in the Join message, and it is determined that the state of the Active Interface in the multicast routing state is null or that the Active Interface is the same as the Pre-handover Interface when receiving data through the Pre-handover Interface for the first time, set the state of the Active Interface according to the state of the Pre-handover Interface and set the state of the Pre-handover Interface to null.

In the above-described technical solution according to the embodiment of the present invention, the MAG1 sends to the MAG2 the information, such as the multicast group address of the multicast source, RP address, and the method of multicast mode selecting by the extended Handover Initiate (HI) and Handover Acknowledge (HAck) signaling messages before the handover of the multicast source, and establishes the bidirectional tunnel between the MAG1 and the MAG2 in advance. Before the multicast source completes the processes such as binding updating, authenticating, and re-establishing a multicast tree, multicast data are transmitted to the original multicast tree along the path of multicast source→MAG2→MAG1, and thereby forwarded to a multicast receiving node. In this way, the pausing time of multicast service is minimized, and once the multicast source establishes the connection with the MAG2, the multicast service can be recovered. In the case that the SPT with multicast tree update mode is adopted, the following analyses can be performed according to the technical solution according to the embodiment of the present invention.

In the prior art, the delay of a handover of a multicast source is: the time for the multicast source moving to and connecting to an MAG2+the time for the MAG2 binding to a LMA (including the time for sending, transmitting and LMA authenticating the PBU, PBA messages)+the time for reconstructing a multicast tree (in the SPT mode). While in the case of using the present solution, the delay of a handover of a multicast source only is the time for the multicast source moving to and connecting to an MAG2. It is thus clear that with the present solution, the delay of a handover of a multicast source is reduced effectively, and the recovery of multicast service can be recovered with in a delay as short as possible. Furthermore, in the case that the SPT with multicast tree update mode is adopted, since the pre-updating of a multicast tree is started in the beginning of a handover, the time required by waiting to reconstruct a multicast tree is also reduced effectively.

Further, according to the present invention, the post-handover multicast mode of the prior art is complemented. For different cases of handover in practices, the present invention defines three types of post-handover multicast modes: a RPT mode, an SPT without multicast tree update mode, and an SPT with multicast tree pre-update mode. Each of the modes takes different handover modes for different implementation cases, in this way it can fit the actual more, the availability is higher, and the cases of wasting network resource, multicast service delay too long and the like are avoided.

Further, the present invention also defines a method for pre-updating an SPT. The pre-update of a multicast tree is started before a handover of a mobile node occurs, and the multicast tree is reconstructed in advance, thus the required delay of updating a multicast tree is reduced. Furthermore, the old multicast tree is not affected and data are forwarded along the old multicast tree during the process of pre-updating a multicast tree. The present invention overcomes the problem of RPF detection failure in the case that the multicast source address does not change in the process that a multicast source moves, and ensures that the moving of a multicast source is transparent to a multicast receiver. The time required to wait a multicast tree to be updated after a multicast source MN switches to the MAG2 is reduced, and multicast data loss during the process of updating a multicast tree is avoided.

It is to be understood by those skilled in the art that the embodiment of the present invention can be provided as a method, a system, or a computer program product. Accordingly, the present invention can take the form of an entire hardware embodiment, an entire software embodiment, or an embodiment combining software and hardware aspects. Moreover, the present invention can take the form of a computer program product implemented on one or more computer-usable storage medium (including but not limited to the magnetic disk memory, CD-ROM, optical memory, or the like) containing the computer-usable program code.

The present invention is described by referring to the flowchart and/or block diagram of the method, device (system), and computer program product according to embodiment of the present invention. It should be understood that each one or combination of the flowcharts and/or block diagrams can be implemented by computer program instructions. These computer program instructions can be provided to a general-purpose computer, a special-purpose computer, an embedded processor or a processor of other programmable data processing device to generate a machine, so that the instructions executed by the computer or processor of other programmable data processing device generate the apparatus for implementing the functions specified in one or more procedures of the flowcharts and/or one or more blocks of the block diagrams.

These computer program instructions can also be stored in a computer-readable memory which is able to instruct the computer or other programmable data processing device to work in a particular manner, so that the instructions stored in the computer-readable memory generate a product including the instruction apparatus which implement the functions specified in one or more procedures of the flowcharts and/or one or more blocks of the block diagrams.

These computer program instructions can also be loaded into the computer or other programmable data processing device, so as to perform a series of operating steps on the computer or other programmable device to generate the computer-implemented processing, thereby the instructions executed on the computer or other programmable data processing device provide steps for implementing the functions specified in one or more procedures of the flowcharts and/or one or more blocks of the block diagrams.

Although preferred embodiments of the present invention has been described, further variations and modifications can be made to these embodiments by those skilled in the art on learning of the basic inventive concept. Therefore, the appended claims are intended to be construed as including preferred embodiments and all variations and modifications which fall within the scope of the invention.

What is claimed is:

1. A method for updating a multicast tree, comprising:
   receiving, by a first multicast node, a data packet sent by a first Mobile Access Gateway (MAG);
   constructing, by the first multicast node, a Join message for generating a multicast tree when it is determined that a multicast source handover instruction is carried in the data packet, and forwarding address information of a second MAG carried in the data packet via the Join message;

updating, by a second multicast node which receives the Join message, a multicast routing according to the address information of the second MAG carried in the Join message; and continuing forwarding the Join message, by the second multicast node, until the second MAG receives the Join message after the second multicast node updates the multicast routing according to the address information of the second MAG;

wherein the updating the multicast routing, by the second multicast node which receives the Join message, according to the address information of the second MAG carried in the Join message, comprises:

determining, by the second multicast node, whether the second multicast node has a multicast routing state corresponding to the multicast service, and setting a Pre-handover Interface in the multicast routing state as a Reverse Path Forwarding (RPF) interface to the second MAG, if it is determined that the second multicast node has the multicast routing state corresponding to the multicast service; and creating a multicast routing state, setting the Pre-handover Interface in the multicast routing state created as the RPF interface to the second MAG, and setting a state of an Active Interface in the multicast routing state to null, if it is determined that the second multicast node has no multicast routing state corresponding to the multicast service.

2. The method according to claim 1, wherein the multicast source handover instruction and the address information of the second MAG are carried in an IPv6 Hop-by-Hop Options Header of the data packet.

3. The method according to claim 1, wherein forwarding, by the first multicast node, the address information of the second MAG carried in the data packet via the Join message comprises:

encapsulating, by the first multicast node, the Join message in a data packet whose destination address is the address of the second MAG, and loading the data packet with the multicast source handover instruction; and forwarding the data packet carrying the multicast source handover instruction, according to a set upstream neighbor router address.

4. The method according to claim 1, wherein after the second multicast node updates the multicast routing according to the address information of the second MAG carried in the Join message, the method further comprises:

receiving, by the second multicast node, data via the Pre-handover Interface for the first time; and setting the state of the Active Interface according to the state of the Pre-handover Interface and setting the state of the Pre-handover Interface to be null, in the case that it is determined that the state of the Active Interface in the multicast routing state is null or the Active Interface is the same as the Pre-handover Interface.

* * * * *